(12) United States Patent
Bédat et al.

(10) Patent No.: US 7,591,887 B2
(45) Date of Patent: Sep. 22, 2009

(54) PRINTING INKS COMPRISING CYCLOHEXANE POLYCARBOXYLIC ACID DERIVATIVES

(75) Inventors: Joelle Bédat, Offendorf (FR); Boris Breitscheidel, Limburgerhof (DE); Richard Selberdinger, Hochdorf-Assenheim (DE)

(73) Assignee: BASF SE (DE)

( * ) Notice: Subject to any disclaimer, the term of this patent is extended or adjusted under 35 U.S.C. 154(b) by 478 days.

(21) Appl. No.: 10/549,471

(22) PCT Filed: Mar. 5, 2004

(86) PCT No.: PCT/EP2004/002238

§ 371 (c)(1),
(2), (4) Date: Sep. 14, 2005

(87) PCT Pub. No.: WO2004/081127

PCT Pub. Date: Sep. 23, 2004

(65) Prior Publication Data

US 2006/0178446 A1    Aug. 10, 2006

(30) Foreign Application Priority Data

Mar. 14, 2003   (DE) .................. 103 11 588
Dec. 19, 2003   (DE) .................. 103 60 391

(51) Int. Cl.
  *C09D 11/02*  (2006.01)
(52) U.S. Cl. ............. 106/31.27; 106/31.58; 106/31.6; 106/31.86
(58) Field of Classification Search ........... 106/31.6, 106/31.58, 31.86, 31.27
See application file for complete search history.

(56) References Cited

U.S. PATENT DOCUMENTS

| | | | |
|---|---|---|---|
| 3,308,086 A | | 3/1967 | Wartmann |
| 5,616,417 A | * | 4/1997 | Ryan .................... 428/428 |
| 5,677,251 A | * | 10/1997 | Sakoske ............... 501/17 |
| 6,284,917 B1 | | 9/2001 | Brunner et al. |
| 6,517,932 B1 | | 2/2003 | Peiffer et al. |
| 6,888,021 B2 | | 5/2005 | Brunner et al. |
| 2003/0187114 A1 | | 10/2003 | Breitscheidel et al. |
| 2004/0024087 A1 | | 2/2004 | Bruchmann et al. |
| 2004/0097684 A1 | | 5/2004 | Bruchmann et al. |
| 2005/0147834 A1 | | 7/2005 | Bruchmann et al. |

FOREIGN PATENT DOCUMENTS

| | | |
|---|---|---|
| DE | 1 263 296 | 3/1968 |
| DE | 28 23 165 | 11/1979 |
| DE | 200 21 356 | 3/2001 |
| DE | 100 32 580 | 1/2002 |
| EP | 0 393 901 | 10/1990 |
| EP | 0 695 329 | 2/1996 |
| EP | 0 707 956 | 4/1996 |
| EP | 0 802 045 | 10/1997 |
| EP | 1 008 442 | 6/2000 |
| EP | 1 162 060 | 12/2001 |
| JP | 09-87558 | 3/1997 |
| JP | 11-309828 | 11/1999 |
| WO | WO-99/32427 | 7/1999 |
| WO | WO-02/36695 | 5/2002 |
| WO | WO-02/36697 | 5/2002 |
| WO | WO-03/029339 | 4/2003 |
| WO | WO-03/093001 | 11/2003 |

* cited by examiner

*Primary Examiner*—Jerry Lorengo
*Assistant Examiner*—Veronica Faison Gee
(74) *Attorney, Agent, or Firm*—Connolly Bove Lodge & Hutz LLP

(57) ABSTRACT

Printing inks, in particular packaging-printing inks, and also printing lacquers, which comprise cyclohexanepolycarboxylic acid derivatives as a component.

12 Claims, No Drawings

PRINTING INKS COMPRISING CYCLOHEXANE POLYCARBOXYLIC ACID DERIVATIVES

RELATED APPLICATIONS

This application is a national stage application (under 35 U.S.C. 371) of PCT/EP2004/002238 filed Mar. 5, 2004 which claims benefit to German application 103 11 588.9 filed Mar. 14, 2003 and German application 103 60 391.3 filed Dec. 19, 2003.

The present invention relates to printing inks, in particular packaging-printing inks, and also printing lacquers, which comprise cyclohexanepolycarboxylic acid derivatives as components.

The printing ink for what are known as mechanical printing processes, such as offset printing, letterpress printing, flexographic printing, intaglio printing, or screen printing is transferred to the print feed stock via contact between the print feed stock and a printing plate or printing block provided with printing ink. Printing inks for these printing processes usually comprise solvents, colorants, binders, and also various additives, such as plasticizers, antistatic agents or waxes. Printing inks for mechanical printing processes comprise high-viscosity paste printing inks for offset printing and letterpress printing, and also liquid printing inks with comparatively low viscosity for flexographic printing and intaglio printing. Further details are disclosed by way of example in "Printing Inks"—Ullmann's Encyclopedia of Industrial Chemistry, Sixth Edition, 1999 Electronic Release.

Printing lacquers can be applied as primer to the print feed stock, or are applied after the printing procedure as a covering, onto the printed print feed stock. By way of example, the primers are applied in order to improve adhesion to the printing feed stock. In the form of a covering, printing lacquers serve, by way of example, to protect the printed image, or serve esthetic purposes, or serve to control application-related properties. By way of example, suitably formulated printing lacquers can be used to influence the roughness of the surface, the electrical properties, or the water-vapor-condensation properties. Printing lacquers are usually applied in-line by means of a lacquering system on the printing machine. Printing lacquers comprise no colorants, but in other respects their constitution is usually similar to that of printing inks.

Printing inks are also used in multilayer materials. Multilayer materials are composed of two or more plastics foils, such as polyolefin foils, metal foils, or metallized plastics foils, which are bonded to one another, by way of example, via lamination or with the aid of suitable laminating adhesives. The composites may also comprise other functional layers, such as odor-barrier layers or water-vapor barriers.

Multilayer materials for the production of packaging have usually been printed or coated. The printing ink here may have been applied to the surface of the multilayer material, but in particular its location may also be between two foils. The person skilled in the art is aware that a very low content of residual solvent in the dried printing ink is important for good strength of the composite.

Printing inks usually comprise various auxiliaries or additives, alongside binders, solvents, and colorants. These auxiliaries or additives serve in particular for fine adjustment of the application-related properties of the printing ink, examples being adhesion, abrasion resistance, drying rate, or slip.

Plasticizers are responsible, by way of example, for improved elasticity of the ink film on the print feed stock. This is particularly important when printing on nonabsorbent print feedstocks, such as polymer foils or metal foils, because here the printing ink is of course unable to penetrate into the print feed stock, but after evaporation of the solvent a dried film remains on the print feedstock. Printing inks for these types of print feed stocks therefore have to have very good film-forming properties, and also have to have very particularly good abrasion resistance and adhesion, so that the print film does not release from the substrate when subjected to mechanical stress.

It is known that plasticizers can be used in printing inks, examples being phthalic diesters, such as dibutyl phthalate, or citric esters, such as tributyl acetylcitrate.

However, in recent times phthalic diesters have been said to be potential health hazards. By way of example, WO 99/32427, WO 03/29339, DE 200 21 356, DE-A 28 23 165, or DE-A 12 63 296 have proposed using cyclohexanepolycarboxylic acids and derivatives of these as plasticizers for plastics.

The earlier application WO 03/29339, which is not a prior publication, discloses the use of cyclohexanepolycarboxylic diesters with $C_2$-$C_6$ alcohols as cosolvents in offset printing inks.

However, there has been no disclosure hitherto of the use of cyclohexanepoly-carboxylic acid derivatives as plasticizers in printing inks, in particular packaging-printing inks.

It was an object of the present invention to provide improved printing inks, in particular improved packaging-printing inks, and to lower the production costs.

Accordingly, printing inks have been found which comprise at least one solvent or one mixture of various solvents, at least one colorant, at least one polymeric binder, and also one or more additives, where at least one of the additives is a cyclohexanepoly-carboxylic acid derivative.

In one preferred embodiment, the inventive printing ink is a packaging-printing ink.

Printing lacquers have also been found which comprise at least one solvent or a mixture of various solvents, at least one polymeric binder, and also one or more additives, where at least one of the additives is a cyclohexanepolycarboxylic acid derivative.

Surprisingly, it has been found that the use of cyclohexanepolycarboxylic acid derivatives instead of conventional plasticizers gives printing inks with improved properties, whose production is moreover markedly more cost-effective. Firstly, the residual solvent content remaining in the printing ink becomes smaller. This permits multilayer materials to be obtained with better bond strength between the individual layers. The odor of the composite is moreover reduced. This is particularly important for food packaging. Secondly, the same effect is achieved in relation to flexibility, printing capacity, and overprintability of the printing ink even if the amount used is only about 50% of the amount of conventional plasticizers. Printing inks of this type can therefore be produced at markedly lower cost. A particular advantage is that, despite the reduction in the amount of plasticizer, there is no impairment of the other important application-related properties of the printing ink, e.g. adhesion, gloss, abrasion, viscostability.

The following details are relevant to the invention:

The inventive printing inks are printing inks for mechanical printing processes, such as offset printing, letterpress printing, flexographic printing, intaglio printing, or screen printing.

The inventive printing ink is preferably a packaging-printing ink. The term "packaging-printing ink" is self-explanatory and at the same time restrictive. Packaging-printing inks are low-viscosity, fast-drying printing inks, in particular for intaglio printing and/or flexographic printing, and also, if appropriate, for screen printing, and are used for the printing of plastics foils of all types, composite materials, paper, paperboard, or metal foils. Accordingly, they comprise relatively low-boiling solvents. The boiling point of the solvents used is generally not above 140° C. The formulation of screen printing inks is similar to that of flexographic printing inks or intaglio printing inks, but is adjusted to somewhat higher viscosity and usually comprises solvents with somewhat higher boiling points. The inventive printing inks or printing lacquers can also be radiation-curable printing inks.

The nature of the solvent or of the solvent mixture depends on the particular intended use of the printing ink or of the printing lacquer. The person skilled in the art will arrive at a suitable selection from the solvents which in principle can be used. Examples of solvents or components of solvent mixtures comprise hydrocarbons, such as toluene or xylene, and high-boiling mineral oils or vegetable oils, such as soy oil. Alcohols are also suitable, examples being ethanol, 1-propanol, 2-propanol, ethylene glycol, propylene glycol, diethylene glycol, substituted alcohols, such as ethoxypropanol, esters, such as ethyl acetate, isopropyl acetate, n-propyl acetate or n-butyl acetate. It is, of course, also possible to use mixtures of various solvents. Other solvents which are in principle suitable are aqueous solvent mixtures. The amount of solvents usually used, based on the entirety of all of the constituents, is from 10 to 80% by weight, depending on the nature of the printing ink or of the printing lacquer.

Solvents particularly preferred for packaging-printing inks comprise in particular low-boiling solvents, such as ethanol, 1-propanol, or 2-propanol, and substituted alcohols, such as ethoxypropanol, or esters, such as ethyl acetate.

The solvents used in radiation-curable printing inks for viscosity adjustment generally do not comprise the abovementioned solvents, but reactive diluents. Examples comprise butyl acrylate, 2-ethylhexyl acrylate, and in particular polyacrylates, such as 1,4-butanediol di(meth)acrylate, 1,6-hexanediol di(meth)acrylate, or trimethylolpropane tri(meth)acrylate.

The colorant present in the printing inks may be conventional dyes, and in particular conventional pigments. Examples are inorganic pigments, such as titanium dioxide pigments, or iron oxide pigments, interference pigments, carbon blacks, metal powders, particularly aluminum, brass, or copper powders, and also organic pigments, such as azo pigments, phthalocyanine pigments, or isoindoline pigments. It is, of course, also possible to use mixtures of various dyes or colorants. It is also possible to use soluble organic dyes. The amount of colorants is usually from 5 to 25% by weight, based on the entirety of all of the constituents of the printing ink. Of course, printing lacquers comprise no colorant.

The binders used for the inventive printing inks and printing lacquers may in principle comprise the binders conventionally used for printing inks. Examples of suitable binders comprise polyesters, polyamides, PVC copolymers, aliphatic and aromatic ketone resins, melamine-urea resins, melamine-formaldehyde resins, maleinates, rosin derivatives, casein or casein derivatives, ethylcellulose, nitrocellulose, or aromatic or aliphatic polyurethanes. It is also possible to use polymers or copolymers of vinyl acetate, of vinyl alcohol, of acrylates, of methacrylates, of vinylpyrrolidone, or of vinyl acetals. As disclosed in WO 02/36695 and WO 02/36697, hyperbranched polymers having functional groups, such as hyperbranched polyurethanes, polyureas, or polyesteramides, may be used with particular advantage. It is also possible, of course, to use mixtures of various polymeric binders, as long as the selected binders do not have any undesirable properties when compared with one another. The amount of all of the binders is usually from 5 to 20% by weight, based on the entirety of all of the constituents of the printing ink.

Examples of binders which are particularly preferred for packaging-printing inks comprise nitrocellulose, ethylcellulose, hydroxyethylcellulose, and also aliphatic and aromatic polyurethanes and polyureas, in particular hyperbranched polyurethanes and polyureas, and also mixtures of these.

Combinations of at least two different binders have proven successful for packaging-printing inks, in particular for the printing of plastics foils and metal foils. Combinations composed of nitrocellulose and of secondary binders, for example combinations composed of nitrocellulose and of polyurethanes and/or of polyureas, and very particularly preferably of hyperbranched polyureas and of polyurethanes, should also in particular be mentioned.

Particularly suitable solvents for these binders are alcohols and/or esters.

Radiation-curable printing inks comprise binders which comprise crosslinkable groups, such as olefinic groups, vinyl ether groups, or epoxy groups.

The inventive printing inks and the inventive printing lacquers moreover comprise one or more auxiliaries or additives. Examples of additives and auxiliaries are fillers, such as calcium carbonate, aluminum oxide hydrate, or aluminum silicate or magnesium silicate. Waxes increase abrasion resistance and serve to increase slip. Particular examples are polyethylene waxes, oxidized polyethylene waxes, petroleum waxes, or ceresin waxes. Fatty acid amides can be used to increase surface smoothness. Plasticizers serve to increase the elasticity of the dried film. Another additive used for radiation-curable printing inks is at least one photoinitiator or one photoinitiator system. Dispersing agents can be used to disperse the pigments. The total amount of all of the additives and auxiliaries does not usually exceed 20% by weight, based on the entirety of all of the constituents, and is usually from 0.1 to 10% by weight, particularly preferably from 0.5 to 5% by weight.

According to the invention, at least one of the fillers is at least one cyclohexanepolycarboxylic acid derivative. This auxiliary is preferably used as plasticizer, particularly preferably in packaging-printing inks, but also has other advantageous consequential effects, for example a reduction in residual solvent content. However, this auxiliary can also, of course, be used by the person skilled in the art in order to achieve other effects.

The cyclohexanepolycarboxylic acid derivatives present according to the invention are in particular mono, di-, or, if appropriate, tri- or tetraesters, or else anhydrides of cyclohexanepolycarboxylic acids. It is preferable that all of the carboxylic acid groups have been esterified. The esters used are alkyl, cycloalkyl, and also alkoxyalkyl esters, and the alkyl, cycloalkyl, and also alkoxyalkyl groups here generally comprise from 1 to 30, preferably from 2 to 20, and particularly preferably from 3 to 18, carbon atoms, and may be branched or linear.

The cyclohexanepolycarboxylic acid derivative can be selected from the group consisting of ring-hydrogenated mono- and dialkyl esters of phthalic acid, isoplithalic acid and terephthalic acid, ring-hydrogenated monoalkyl ester of trimellitic acid, dialkyl ester of trimellitic acid, trialkyl ester of trimellitic acid, trimesie acid and hemimellitic acid, ring-hydrogenated mono-, di-, tri-, and tetraalkyl esters of pyromellitic acid, where the alkyl groups may be linear or branched and in each case have from 1 to 30 carbon atoms, or from the group consisting of two or more of these.

Individual compounds which should be mentioned are: alkyl esters of cyclohexane-1,4-dicarboxylic acid, e.g. monomethyl ester of cyclohexane-1,4-dicarboxylic acid, dimethyl ester of cyclohexane-1,4-dicarboxylic acid, diethyl ester of cyclohexane-1,4-dicarboxylic acid, di-n-propyl ester of cyclohexane-1,4-dicarboxylic acid, di-n-butyl ester of cyclohexane-1,4-dicarboxylic acid, di-tert-butyl ester of cyclohexane-1,4-dicarboxylic acid, diisobutyl ester of cyclohexane-1,4-dicarboxylic acid, monoglycol ester of cyclohexane-1,4-dicarboxylic acid, diglycol ester of cyclohexane-1,4-dicarboxylic acid, di-n-octyl ester of cyclohexane-1,4-dicarboxylic acid, diisooctyl ester of cyclohexane-1,4-dicarboxylic acid, mono-2-ethylhexyl ester of cyclohexane-1,4-dicarboxylic acid, di-2-ethylhexyl ester of cyclohexane-1,4-dicarboxylic acid, di-n-nonyl ester of cyclohexane-1,4-dicarboxylic acid, diisononyl ester of cyclohexane-1,4-dicarboxylic acid, di-n-decyl ester of cyclohexane-1,4-dicarboxylic acid, di-n-undecyl ester of cyclohexane-1,4-dicarboxylic acid, diisodecyl ester of cyclohexane-1,4-dicarboxylic acid, diisododecyl ester of cyclohexane-1,4-dicarboxylic acid, di-n-octadecyl ester of cyclohexane-1,4-dicarboxylic acid, diisooctadecyl ester of cyclohexane-1,4-dicarboxylic acid, di-n-eicosyl ester of cyclohexane-1,4-dicarboxylic acid, monocyclohexyl ester of cyclohexane-1,4-dicarboxylic acid, dicyclohexyl ester of cyclohexane-1,4-dicarboxylic acid;

diisopropyl ester of cyclohexane-1,4-dicarboxylic acid, di-n-hexyl ester of cyclohexane-1,4-dicarboxylic acid, diisohexyl ester of cyclohexane-1,4-dicarboxylic acid, di-n-heptyl ester of cyclohexane-1,4-dicarboxylic acid, diisoheptyl ester of cyclohexane-1,4-dicarboxylic acid, di-2-propylheptyl ester of cyclohexane-1,4-dicarboxylic acid, diisoundecyl ester of cyclohexane-1,4-dicarboxylic acid, di-n-dodecyl ester of cyclohexane-1,4-dicarboxylic acid, di-n-tridecyl ester of cyclohexane-1,4-dicarboxylic acid, diisotridecyl ester of cyclohexane-1,4-dicarboxylic acid, di-n-pentyl ester of cyclohexane-1,4-dicarboxylic acid, diisopentyl ester of cyclohexane-1,4-dicarboxylic acid;

diisopropyl ester of cyclohexane-1,2-dicarboxylic acid, di-n-hexyl ester of cyclohexane-1,2-dicarboxylic acid, diisohexyl ester of cyclohexane-1,2-dicarboxylic acid, di-n-heptyl ester of cyclohexane-1,2-dicarboxylic acid, diisoheptyl ester of cyclohexane-1,2-dicarboxylic acid, di-2-propylheptyl ester of cyclohexane-1,2-dicarboxylic acid, diisoundecyl ester of cyclohexane-1,2-dicarboxylic acid, di-n-dodecyl ester of cyclohexane-1,2-dicarboxylic acid, di-n-tridecyl ester of cyclohexane-1,2-dicarboxylic acid, diisotridecyl ester of cyclohexane-1,2-dicarboxylic acid, di-n-pentyl ester of cyclohexane-1,2-dicarboxylic acid, diisopentyl ester of cyclohexane-1,2-dicarboxylic acid;

alkyl esters of cyclohexane-1,2-dicarboxylic acid, e.g. monomethyl ester of cyclohexane-1,2-dicarboxylic acid, dimethyl ester of cyclohexane-1,2-dicarboxylic acid, diethyl ester of cyclohexane-1,2-dicarboxylic acid, di-n-propyl ester of cyclohexane-1,2-dicarboxylic acid, di-n-butyl ester of cyclohexane-1,2-dicarboxylic acid, di-tert-butyl ester of cyclohexane-1,2-dicarboxylic acid, diisobutyl ester of cyclohexane-1,2-dicarboxylic acid, monoglycol ester of cyclohexane-1,2-dicarboxylic acid, diglycol ester of cyclohexane-1,2-dicarboxylic acid, di-n-octyl ester of cyclohexane-1,2-dicarboxylic acid, diisooctyl ester of cyclohexane-1,2-dicarboxylic acid, di-2-ethylhexyl ester of cyclohexane-1,2-dicarboxylic acid, di-n-nonyl ester of cyclohexane-1,2-dicarboxylic acid, diisononyl ester of cyclohexane-1,2-dicarboxylic acid, di-n-decyl ester of cyclohexane-1,2-dicarboxylic acid, diisodecyl ester of cyclohexane-1,2-dicarboxylic acid, di-n-undecyl ester of cyclohexane-1,2-dicarboxylic acid, diisododecyl ester of cyclohexane-1,2-dicarboxylic acid, di-n-octadecyl ester of cyclohexane-1,2-dicarboxylic acid, diisooctadecyl ester of cyclohexane-1,2-dicarboxylic acid, di-n-eicosyl ester of cyclohexane-1,2-dicarboxylic acid, monocyclohexyl ester of cyclohexane-1,2-dicarboxylic acid, dicyclohexyl ester of cyclohexane-1,2-dicarboxylic acid;

mixed esters of cyclohexane-1,2-dicarboxylic acid with $C_1$-$C_{13}$ alcohols, e.g. ethyl methyl ester of cyclohexane-1,2-dicarboxylic acid, n-propyl methyl ester of cyclohexane-1,2-dicarboxylic acid, isopropyl methyl ester of cyclohexane-1,2-dicarboxylic acid, n-butyl methyl ester of cyclohexane-1,2-dicarboxylic acid, tert-butyl methyl ester of cyclohexane-1,2-dicarboxylic acid, isobutyl methyl ester of cyclohexane-1,2-dicarboxylic acid, glycol methyl ester of cyclohexane-1,2-dicarboxylic acid, n-hexyl methyl ester of cyclohexane-1,2-dicarboxylic acid, isohexyl methyl ester of cyclohexane-1,2-dicarboxylic acid, n-heptyl methyl ester of cyclohexane-1,2-dicarboxylic acid, isoheptyl methyl ester of cyclohexane-1,2-dicarboxylic acid, n-octyl methyl ester of cyclohexane-1,2-dicarboxylic acid, isooctyl methyl ester of cyclohexane-1,2-dicarboxylic acid, 2-ethylhexyl methyl ester of cyclohexane-1,2-dicarboxylic acid, n-nonyl methyl ester of cyclohexane-1,2-dicarboxylic acid, isononyl methyl ester of cyclohexane-1,2-dicarboxylic acid, 2-propylheptyl methyl ester of cyclohexane-1,2-dicarboxylic acid, n-decyl methyl ester of cyclohexane-1,2-dicarboxylic acid, isodecyl methyl ester of cyclohexane-1,2-dicarboxylic acid, n-undecyl methyl ester of cyclohexane-1,2-dicarboxylic acid, isoundecyl methyl ester of cyclohexane-1,2-dicarboxylic acid, n-dodecyl methyl ester of cyclohexane-1,2-dicarboxylic acid, isododecyl methyl ester of cyclohexane-1,2-dicarboxylic acid, n-tridecyl methyl ester of cyclohexane-1,2-dicarboxylic acid, isotridecyl methyl ester of cyclohexane-1,2-dicarboxylic acid, n-propyl ethyl ester of cyclohexane-1,2-dicarboxylic acid, isopropyl ethyl ester of cyclohexane-1,2-dicarboxylic acid, n-butyl ethyl ester of cyclohexane-1,2-dicarboxylic acid, tert-butyl ethyl ester of cyclohexane-1,2-dicarboxylic acid, isobutyl ethyl ester of cyclohexane-1,2-dicarboxylic acid, glycol ethyl ester of cyclohexane-1,2-dicarboxylic acid, n-hexyl ethyl ester of cyclohexane-1,2-dicarboxylic acid, isohexyl ethyl ester of cyclohexane-1,2-dicarboxylic acid, n-heptyl ethyl ester of cyclohexane-1,2-dicarboxylic acid, isoheptyl ethyl ester of cyclohexane-1,2-dicarboxylic acid, n-octyl ethyl ester of cyclohexane-1,2-dicarboxylic acid, isooctyl ethyl ester of cyclohexane-1,2-dicarboxylic acid, 2-ethylhexyl ethyl ester of cyclohexane-1,2-dicarboxylic acid, n-nonyl ethyl ester of cyclohexane-1,2-dicarboxylic acid, isononyl ethyl ester of cyclohexane-1,2-dicarboxylic acid, 2-propylheptyl ethyl ester of cyclohexane-1,2-dicarboxylic acid, n-decyl ethyl ester of cyclohexane-1,2-dicarboxylic acid, isodecyl ethyl ester of cyclohexane-1,2-dicarboxylic acid, n-undecyl ethyl ester of cyclohexane-1,2-dicarboxylic acid, isoundecyl ethyl ester of cyclohexane-1,2-dicarboxylic acid, n-dodecyl ethyl ester of cyclohexane-1,2-dicarboxylic acid, isododecyl ethyl ester of cyclohexane-1,2-dicarboxylic acid, n-tridecyl ethyl ester of cyclohexane-1,2-dicarboxylic acid, isotridecyl ethyl ester of cyclohexane-1,2-dicarboxylic acid, isopropyl n-propyl ester of cyclohexane-1,2-dicarboxylic acid, n-butyl n-propyl ester of cyclohexane-1,2-dicarboxylic acid, tert-butyl n-propyl ester of cyclohexane-1,2-dicarboxylic acid, isobutyl n-propyl ester of cyclohexane-1,2-dicarboxylic acid, glycol n-propyl ester of cyclohexane-1,2-dicarboxylic acid, n-hexyl n-propyl ester of cyclohexane-1,2-dicarboxylic acid, isohexyl n-propyl ester of cyclohexane-1,2-dicarboxylic acid, n-heptyl n-propyl ester of cyclohexane-1,2-dicarboxylic acid, isoheptyl n-propyl ester of cyclohexane-1,2-dicarboxylic acid, n-octyl n-propyl ester of cyclohexane-1,2-dicarboxylic acid, isooctyl n-propyl ester of cyclohexane-1,2-dicarboxylic acid, 2-ethylhexyl n-propyl ester of cyclohexane-1,2-dicarboxylic acid, n-nonyl n-propyl ester of cyclohexane-1,2-dicarboxylic acid, isononyl n-propyl ester of cyclohexane-1,2-dicarboxylic acid, 2-propylheptyl n-propyl ester of cyclohexane-1,2-dicarboxylic acid, n-decyl n-propyl ester of cyclohexane-1,2-dicarboxylic acid, isodecyl n-propyl ester of cyclohexane-1,2-dicarboxylic acid, n-undecyl n-propyl ester of cyclohexane-1,2-dicarboxylic acid, isoundecyl n-propyl ester of cyclohexane-1,2-dicarboxylic acid, n-dodecyl n-propyl ester of cyclohexane-1,2-dicarboxylic acid, isododecyl n-propyl ester of cyclohexane-1,2-dicarboxylic acid, n-tridecyl n-propyl ester of cyclohexane-1,2-dicarboxylic acid, isotridecyl n-propyl ester of cyclohexane-1,2-dicarboxylic acid, n-butyl isopropyl ester of cyclohexane-1,2-dicarboxylic acid, tert-butyl isopropyl ester of cyclohexane-1,2-dicarboxylic acid, isobutyl isopropyl ester of cyclohexane-1,2-dicarboxylic acid, glycol isopropyl ester of cyclohexane-1,2-dicarboxylic acid, n-hexyl isopropyl ester of cyclohexane-1,2-dicarboxylic acid, isohexyl isopropyl ester of cyclohexane-1,2-dicarboxylic acid, n-heptyl isopropyl ester of cyclohexane-1,2-dicarboxylic acid, isoheptyl isopropyl ester of cyclohexane-1,2-dicarboxylic acid, n-octyl isopropyl ester of cyclohexane-1,2-dicarboxylic acid, isooctyl isopropyl ester of cyclohexane-1,2-dicarboxylic acid, 2-ethylhexyl isopropyl ester of cyclohexane-1,2-dicarboxylic acid, n-nonyl isopropyl ester of cyclohexane-1,2-dicarboxylic acid, isononyl isopropyl ester of cyclohexane-1,2-dicarboxylic acid, 2-propylheptyl isopropyl ester of cyclohexane-1,2-dicarboxylic acid, n-decyl isopropyl ester of cyclohexane-1,2-dicarboxylic acid, isodecyl isopropyl ester of cyclohexane-1,2-dicarboxylic acid, n-undecyl isopropyl ester of cyclohexane-1,2-dicarboxylic acid, isoundecyl isopropyl ester of cyclohexane-1,2-dicarboxylic acid, n-dodecyl isopropyl ester of cyclohexane-1,2-dicarboxylic acid, isododecyl isopropyl ester of cyclohexane-1,2-dicarboxylic acid, n-tridecyl isopropyl ester of cyclohexane-1,2-dicarboxylic acid, isotridecyl isopropyl ester of cyclohexane-1,2-dicarboxylic acid, tert-butyl n-butyl ester of cyclohexane-1,2-dicarboxylic acid, isobutyl n-butyl ester of cyclohexane-1,2-dicarboxylic acid, glycol n-butyl ester of cyclohexane-1,2-dicarboxylic acid, n-hexyl n-butyl ester of cyclohexane-1,2-dicarboxylic acid, isohexyl n-butyl ester of cyclohexane-1,2-dicarboxylic acid, n-heptyl n-butyl ester of cyclohexane-1,2-dicarboxylic acid, isoheptyl n-butyl ester of cyclohexane-1,2-dicarboxylic acid, n-octyl n-butyl ester of cyclohexane-1,2-dicarboxylic acid, isooctyl n-butyl ester of cyclohexane-1,2-dicarboxylic acid, 2-ethylhexyl n-butyl ester of cyclohexane-1,2-dicarboxylic acid, n-nonyl n-butyl ester of cyclohexane-1,2-dicarboxylic acid, isononyl n-butyl ester of cyclohexane-1,2-dicarboxylic acid, 2-propylheptyl n-butyl ester of cyclohexane-1,2-dicarboxylic acid, n-decyl n-butyl ester of cyclohexane-1,2-dicarboxylic acid, isodecyl n-butyl ester of cyclohexane-1,2-dicarboxylic acid, n-undecyl n-butyl ester of cyclohexane-1,2-dicarboxylic acid, isoundecyl n-butyl ester of cyclohexane-1,2-dicarboxylic acid, n-dodecyl n-butyl ester of cyclohexane-1,2-dicarboxylic acid, isododecyl n-butyl ester of cyclohexane-1,2-dicarboxylic acid, n-tridecyl n-butyl ester of cyclohexane-1,2-dicarboxylic acid, isotridecyl n-butyl ester of cyclohexane-1,2-dicarboxylic acid, isobutyl tert-butyl ester of cyclohexane-1,2-dicarboxylic acid, glycol tert-butyl ester of cyclohexane-1,2-dicarboxylic acid, n-hexyl tert-butyl ester of cyclohexane-1,2-dicarboxylic acid, isohexyl tert-butyl ester of cyclohexane-1,2-dicarboxylic acid, n-heptyl tert-butyl ester of cyclohexane-1,2-dicarboxylic acid, isoheptyl tert-butyl ester of cyclohexane-1,2-dicarboxylic acid, n-octyl tert-butyl ester of cyclohexane-1,2-dicarboxylic acid, isooctyl tert-butyl ester of cyclohexane-1,2-dicarboxylic acid, 2-ethylhexyl tert-butyl ester of cyclohexane-1,2-dicarboxylic acid, n-nonyl tert-butyl ester of cyclohexane-1,2-dicarboxylic acid, isononyl tert-butyl ester of cyclohexane-1,2-dicarboxylic acid, 2-propylheptyl tert-butyl ester of cyclohexane-1,2-dicarboxylic acid, n-decyl tert-butyl ester of cyclohexane-1,2-dicarboxylic acid, isodecyl tert-butyl ester of cyclohexane-1,2-dicarboxylic acid, n-undecyl tert-butyl ester of cyclohexane-1,2-dicarboxylic acid, isoundecyl tert-butyl ester of cyclohexane-1,2-dicarboxylic acid, n-dodecyl tert-butyl ester of cyclohexane-1,2-dicarboxylic acid, isododecyl tert-butyl ester of cyclohexane-1,2-dicarboxylic acid, n-tridecyl tert-butyl ester of cyclohexane-1,2-dicarboxylic acid, isotridecyl tert-butyl ester of cyclohexane-1,2-dicarboxylic acid, glycol isobutyl ester of cyclohexane-1,2-dicarboxylic acid, n-hexyl isobutyl ester of cyclohexane-1,2-dicarboxylic acid, isohexyl isobutyl ester of cyclohexane-1,2-dicarboxylic acid, n-heptyl isobutyl ester of cyclohexane-1,2-dicarboxylic acid, isoheptyl isobutyl ester of cyclohexane-1,2-dicarboxylic acid, n-octyl isobutyl ester of cyclohexane-1,2-dicarboxylic acid, isooctyl isobutyl ester of cyclohexane-1,2-dicarboxylic acid, 2-ethylhexyl isobutyl ester of cyclohexane-1,2-dicarboxylic acid, n-nonyl isobutyl ester of cyclohexane-1,2-dicarboxylic acid, isononyl isobutyl ester of cyclohexane-1,2-dicarboxylic acid, 2-propylheptyl isobutyl ester of cyclohexane-1,2-dicarboxylic acid, n-decyl isobutyl ester of cyclohexane-1,2-dicarboxylic acid, isodecyl isobutyl ester of cyclohexane-1,2-dicarboxylic acid, n-undecyl isobutyl ester of cyclohexane-1,2-dicarboxylic acid, isoundecyl isobutyl ester of cyclohexane-1,2-dicarboxylic acid, n-dodecyl isobutyl ester of cyclohexane-1,2-dicarboxylic acid, isododecyl isobutyl ester of cyclohexane-1,2-dicarboxylic acid, n-tridecyl isobutyl ester of cyclohexane-1,2-dicarboxylic acid, isotridecyl isobutyl ester of cyclohexane-1,2-dicarboxylic acid, n-hexyl glycol ester of cyclohexane-1,2-dicarboxylic acid, isohexyl glycol ester of cyclohexane-1,2-dicarboxylic acid, n-heptyl glycol ester of cyclohexane-1,2-dicarboxylic acid, isoheptyl glycol ester of cyclohexane-1,2-dicarboxylic acid, n-octyl glycol ester of cyclohexane-1,2-dicarboxylic acid, isooctyl glycol ester of cyclohexane-1,2-dicarboxylic acid, 2-ethylhexyl glycol ester of cyclohexane-1,2-dicarboxylic acid, n-nonyl glycol ester of cyclohexane-1,2-dicarboxylic acid, isononyl glycol ester of cyclohexane-1,2-dicarboxylic acid, 2-propylheptyl glycol ester of cyclohexane-1,2-dicarboxylic acid, n-decyl glycol ester of cyclohexane-1,2-dicarboxylic acid, isodecyl glycol ester of cyclohexane-1,2-dicarboxylic acid, n-undecyl glycol ester of cyclohexane-1,2-dicarboxylic acid, isoundecyl glycol ester of cyclohexane-1,2-dicarboxylic acid, n-dodecyl glycol ester of cyclohexane-1,2-dicarboxylic acid, isododecyl glycol ester of cyclohexane-1,2-dicarboxylic acid, n-tridecyl glycol ester of cyclohexane-1,2-dicarboxylic acid, isotridecyl glycol ester of cyclohexane-1,2-dicarboxylic acid, isohexyl n-hexyl ester of cyclohexane-1,2-dicarboxylic acid, n-heptyl n-hexyl ester of cyclohexane-1,2-dicarboxylic acid, isoheptyl n-hexyl ester of cyclohexane-1,2-dicarboxylic acid, n-octyl n-hexyl ester of cyclohexane-1,2-dicarboxylic acid, isooctyl n-hexyl ester of cyclohexane-1,2-dicarboxylic acid, 2-ethylhexyl n-hexyl ester of cyclohexane-1,2-dicarboxylic acid, n-nonyl n-hexyl ester of cyclohexane-1,2-dicarboxylic acid, isononyl n-hexyl ester of cyclohexane-1,2-dicarboxylic acid, 2-propylheptyl n-hexyl ester of cyclohexane-1,2-dicarboxylic acid, n-decyl n-hexyl ester of cyclohexane-1,2-dicarboxylic acid, isodecyl n-hexyl ester of cyclohexane-1,2-dicarboxylic acid, n-undecyl n-hexyl ester of cyclohexane-1,2-dicarboxylic acid, isoundecyl n-hexyl ester of cyclohexane-1,2-dicarboxylic acid, n-dodecyl n-hexyl ester of cyclohexane-1,2-dicarboxylic acid, isododecyl n-hexyl ester of cyclohexane-1,2-dicarboxylic acid, n-tridecyl n-hexyl ester of cyclohexane-1,2-dicarboxylic acid, isotridecyl n-hexyl ester of cyclohexane-1,2-dicarboxylic acid, n-heptyl isohexyl ester of cyclohexane-1,2-dicarboxylic acid, isoheptyl isohexyl ester of cyclohexane-1,2-dicarboxylic acid, n-octyl isohexyl ester of cyclohexane-1,2-dicarboxylic acid, isooctyl isohexyl ester of cyclohexane-1,2-dicarboxylic acid, 2-ethylhexyl isohexyl ester of cyclohexane-1,2-dicarboxylic acid, n-nonyl isohexyl ester of cyclohexane-1,2-dicarboxylic acid, isononyl isohexyl ester of cyclohexane-1,2-dicarboxylic acid, 2-propylheptyl isohexyl ester of cyclohexane-1,2-dicarboxylic acid, n-decyl isohexyl ester of cyclohexane-1,2-dicarboxylic acid, isodecyl isohexyl ester of cyclohexane-1,2-dicarboxylic acid, n-undecyl isohexyl ester of cyclohexane-1,2-dicarboxylic acid, isoundecyl isohexyl ester of cyclohexane-1,2-dicarboxylic acid, n-dodecyl isohexyl ester of cyclohexane-1,2-dicarboxylic acid, isododecyl isohexyl ester of cyclohexane-1,2-dicarboxylic acid, n-tridecyl isohexyl ester of cyclohexane-1,2-dicarboxylic acid, isotridecyl isohexyl ester of cyclohexane-1,2-dicarboxylic acid, isoheptyl n-heptyl ester of cyclohexane-1,2-dicarboxylic acid, n-octyl n-heptyl ester of cyclohexane-1,2-dicarboxylic acid, isooctyl n-heptyl ester of cyclohexane-1,2-dicarboxylic acid, 2-ethylhexyl n-heptyl ester of cyclohexane-1,2-dicarboxylic acid, n-nonyl n-heptyl ester of cyclohexane-1,2-dicarboxylic acid, isononyl n-heptyl ester of cyclohexane-1,2-dicarboxylic acid, 2-propylheptyl n-heptyl ester of cyclohexane-1,2-dicarboxylic acid, n-decyl n-heptyl ester of cyclohexane-1,2-dicarboxylic acid, isodecyl n-heptyl ester of cyclohexane-1,2-dicarboxylic acid, n-undecyl n-heptyl ester of cyclohexane-1,2-dicarboxylic acid, isoundecyl n-heptyl ester of cyclohexane-1,2-dicarboxylic acid, n-dodecyl n-heptyl ester of cyclohexane-1,2-dicarboxylic acid, isododecyl n-heptyl ester of cyclohexane-1,2-dicarboxylic acid, n-tridecyl n-heptyl ester of cyclohexane-1,2-dicarboxylic acid, isotridecyl n-heptyl ester of cyclohexane-1,2-dicarboxylic acid, n-octyl isoheptyl ester of cyclohexane-1,2-dicarboxylic acid, isooctyl isoheptyl ester of cyclohexane-1,2-dicarboxylic acid, 2-ethylhexyl isoheptyl ester of cyclohexane-1,2-dicarboxylic acid, n-nonyl isoheptyl ester of cyclohexane-1,2-dicarboxylic acid, isononyl isoheptyl ester of cyclohexane-1,2-dicarboxylic acid, 2-propylheptyl isoheptyl ester of cyclohexane-1,2-dicarboxylic acid, n-decyl isoheptyl ester of cyclohexane-1,2-dicarboxylic acid, isodecyl isoheptyl ester of cyclohexane-1,2-dicarboxylic acid, n-undecyl isoheptyl ester of cyclohexane-1,2-dicarboxylic acid, isoundecyl isoheptyl ester of cyclohexane-1,2-dicarboxylic acid, n-dodecyl isoheptyl ester of cyclohexane-1,2-dicarboxylic acid, isododecyl isoheptyl ester of cyclohexane-1,2-dicarboxylic acid, n-tridecyl isoheptyl ester of cyclohexane-1,2-dicarboxylic acid, isotridecyl isoheptyl ester of cyclohexane-1,2-dicarboxylic acid, isooctyl n-octyl ester of cyclohexane-1,2-dicarboxylic acid, 2-ethylhexyl n-octyl ester of cyclohexane-1,2-dicarboxylic acid, n-nonyl n-octyl ester of cyclohexane-1,2-dicarboxylic acid, isononyl n-octyl ester of cyclohexane-1,2-dicarboxylic acid, 2-propylheptyl n-octyl ester of cyclohexane-1,2-dicarboxylic acid, n-decyl n-octyl ester of cyclohexane-1,2-dicarboxylic acid, isodecyl n-octyl ester of cyclohexane-1,2-dicarboxylic acid, n-undecyl n-octyl ester of cyclohexane-1,2-dicarboxylic acid, isoundecyl n-octyl ester of cyclohexane-1,2-dicarboxylic acid, n-dodecyl n-octyl ester of cyclohexane-1,2-dicarboxylic acid, isododecyl n-octyl ester of cyclohexane-1,2-dicarboxylic acid, n-tridecyl n-octyl ester of cyclohexane-1,2-dicarboxylic acid, isotridecyl n-octyl ester of cyclohexane-1,2-dicarboxylic acid, 2-ethylhexyl isooctyl ester of cyclohexane-1,2-dicarboxylic acid, n-nonyl isooctyl ester of cyclohexane-1,2-dicarboxylic acid, isononyl isooctyl ester of cyclohexane-1,2-dicarboxylic acid, 2-propylheptyl isooctyl ester of cyclohexane-1,2-dicarboxylic acid, n-decyl isooctyl ester of cyclohexane-1,2-dicarboxylic acid, isodecyl isooctyl ester of cyclohexane-1,2-dicarboxylic acid, n-undecyl isooctyl ester of cyclohexane-1,2-dicarboxylic acid, isoundecyl isooctyl ester of cyclohexane-1,2-dicarboxylic acid, n-dodecyl isooctyl ester of cyclohexane-1,2-dicarboxylic acid, isododecyl isooctyl ester of cyclohexane-1,2-dicarboxylic acid, n-tridecyl isooctyl ester of cyclohexane-1,2-dicarboxylic acid, isotridecyl isooctyl ester of cyclohexane-1,2-dicarboxylic acid, n-nonyl 2-ethylhexyl ester of cyclohexane-1,2-dicarboxylic acid, isononyl 2-ethylhexyl ester of cyclohexane-1,2-dicarboxylic acid, 2-propylheptyl 2-ethylhexyl ester of cyclohexane-1,2-dicarboxylic acid, n-decyl 2-ethylhexyl ester of cyclohexane-1,2-dicarboxylic acid, isodecyl 2-ethylhexyl ester of cyclohexane-1,2-dicarboxylic acid, n-undecyl 2-ethylhexyl ester of cyclohexane-1,2-dicarboxylic acid, isoundecyl 2-ethylhexyl ester of cyclohexane-1,2-dicarboxylic acid, n-dodecyl 2-ethylhexyl ester of cyclohexane-1,2-dicarboxylic acid, isododecyl 2-ethylhexyl ester of cyclohexane-1,2-dicarboxylic acid, n-tridecyl 2-ethylhexyl ester of cyclohexane-1,2-dicarboxylic acid, isotridecyl 2-ethylhexyl ester of cyclohexane-1,2-dicarboxylic acid, isononyl n-nonyl ester of cyclohexane-1,2-dicarboxylic acid, 2-propylheptyl n-nonyl ester of cyclohexane-1,2-dicarboxylic acid, n-decyl n-nonyl ester of cyclohexane-1,2-dicarboxylic acid, isodecyl n-nonyl ester of cyclohexane-1,2-dicarboxylic acid, n-undecyl n-nonyl ester of cyclohexane-1,2-dicarboxylic acid, isoundecyl n-nonyl ester of cyclohexane-1,2-dicarboxylic acid, n-dodecyl n-nonyl ester of cyclohexane-1,2-dicarboxylic acid, isododecyl n-nonyl ester of cyclohexane-1,2-dicarboxylic acid, n-tridecyl n-nonyl ester of cyclohexane-1,2-dicarboxylic acid, isotridecyl n-nonyl ester of cyclohexane-1,2-dicarboxylic acid, 2-propylheptyl isononyl ester of cyclohexane-1,2-dicarboxylic acid, n-decyl isononyl ester of cyclohexane-1,2-dicarboxylic acid, isodecyl isononyl ester of cyclohexane-1,2-dicarboxylic acid, n-undecyl isononyl ester of cyclohexane-1,2-dicarboxylic acid, isoundecyl isononyl ester of cyclohexane-1,2-dicarboxylic acid, n-dodecyl isononyl ester of cyclohexane-1,2-dicarboxylic acid, isododecyl isononyl ester of cyclohexane-1,2-dicarboxylic acid, n-tridecyl isononyl ester of cyclohexane-1,2-dicarboxylic acid, isotridecyl isononyl ester of cyclohexane-1,2-dicarboxylic acid, n-decyl 2-propylheptyl ester of cyclohexane-1,2-dicarboxylic acid, isodecyl 2-propylheptyl ester of cyclohexane-1,2-dicarboxylic acid, n-undecyl 2-propylheptyl ester of cyclohexane-1,2-dicarboxylic acid, isoundecyl 2-propylheptyl ester of cyclohexane-1,2-dicarboxylic acid, n-dodecyl 2-propylheptyl ester of cyclohexane-1,2-dicarboxylic acid, isododecyl 2-propylheptyl ester of cyclohexane-1,2-dicarboxylic acid, n-tridecyl 2-propylheptyl ester of cyclohexane-1,2-dicarboxylic acid, isotridecyl 2-propylheptyl ester of cyclohexane-1,2-dicarboxylic acid, isodecyl n-decyl ester of cyclohexane-1,2-dicarboxylic acid, n-undecyl n-decyl ester of cyclohexane-1,2-dicarboxylic acid, isoundecyl n-decyl ester of cyclohexane-1,2-dicarboxylic acid, n-dodecyl n-decyl ester of cyclohexane-1,2-dicarboxylic acid, isododecyl n-decyl ester of cyclohexane-1,2-dicarboxylic acid, n-tridecyl n-decyl ester of cyclohexane-1,2-dicarboxylic acid, isotridecyl n-decyl ester of cyclohexane-1,2-dicarboxylic acid, n-undecyl isodecyl ester of cyclohexane-1,2-dicarboxylic acid, isoundecyl isodecyl ester of cyclohexane-1,2-dicarboxylic acid, n-dodecyl isodecyl ester of cyclohexane-1,2-dicarboxylic acid, isododecyl isodecyl ester of cyclohexane-1,2-dicarboxylic acid, n-tridecyl isodecyl ester of cyclohexane-1,2-dicarboxylic acid, isotridecyl isodecyl ester of cyclohexane-1,2-dicarboxylic acid, isoundecyl n-undecyl ester of cyclohexane-1,2-dicarboxylic acid, n-dodecyl n-undecyl ester of cyclohexane-1,2-dicarboxylic acid, isododecyl n-undecyl ester of cyclohexane-1,2-dicarboxylic acid, n-tridecyl n-undecyl ester of cyclohexane-1,2-dicarboxylic acid, isotridecyl n-undecyl ester of cyclohexane-1,2-dicarboxylic acid, n-dodecyl isoundecyl ester of cyclohexane-1,2-dicarboxylic acid, isododecyl isoundecyl ester of cyclohexane-1,2-dicarboxylic acid, n-tridecyl isoundecyl ester of cyclohexane-1,2-dicarboxylic acid, isotridecyl isoundecyl ester of cyclohexane-1,2-dicarboxylic acid, isododecyl n-dodecyl ester of cyclohexane-1,2-dicarboxylic acid, n-tridecyl n-dodecyl ester of cyclohexane-1,2-dicarboxylic acid, isotridecyl n-dodecyl ester of cyclohexane-1,2-dicarboxylic acid, n-tridecyl isododecyl ester of cyclohexane-1,2-dicarboxylic acid, isotridecyl isododecyl ester of cyclohexane-1,2-dicarboxylic acid, isotridecyl n-tridecyl ester of cyclohexane-1,2-dicarboxylic acid, methyl cyclohexyl ester of cyclohexane-1,2-dicarboxylic acid, ethyl cyclohexyl ester of cyclohexane-1,2-dicarboxylic acid, n-propyl cyclohexyl ester of cyclohexane-1,2-dicarboxylic acid, isopropyl cyclohexyl ester of cyclohexane-1,2-dicarboxylic acid, n-butyl cyclohexyl ester of cyclohexane-1,2-dicarboxylic acid, tert-butyl cyclohexyl ester of cyclohexane-1,2-dicarboxylic acid, isobutyl cyclohexyl ester of cyclohexane-1,2-dicarboxylic acid, glycol cyclohexyl ester of cyclohexane-1,2-dicarboxylic acid, n-hexyl cyclohexyl ester of cyclohexane-1,2-dicarboxylic acid, isohexyl cyclohexyl ester of cyclohexane-1,2-dicarboxylic acid, n-heptyl cyclohexyl ester of cyclohexane-1,2-dicarboxylic acid, isoheptyl cyclohexyl ester of cyclohexane-1,2-dicarboxylic acid, n-octyl cyclohexyl ester of cyclohexane-1,2-dicarboxylic acid, isooctyl cyclohexyl ester of cyclohexane-1,2-dicarboxylic acid, 2-ethylhexyl cyclohexyl ester of cyclohexane-1,2-dicarboxylic acid, n-nonyl cyclohexyl ester of cyclohexane-1,2-dicarboxylic acid, isononyl cyclohexyl ester of cyclohexane-1,2-dicarboxylic acid, 2-propylheptyl cyclohexyl ester of cyclohexane-1,2-dicarboxylic acid, n-decyl cyclohexyl ester of cyclohexane-1,2-dicarboxylic acid, isodecyl cyclohexyl ester of cyclohexane-1,2-dicarboxylic acid, n-undecyl cyclohexyl ester of cyclohexane-1,2-dicarboxylic acid, isoundecyl cyclohexyl ester of cyclohexane-1,2-dicarboxylic acid, n-dodecyl cyclohexyl ester of cyclohexane-1,2-dicarboxylic acid, isododecyl cyclohexyl ester of cyclohexane-1,2-dicarboxylic acid, n-tridecyl cyclohexyl ester of cyclohexane-1,2-dicarboxylic acid, isotridecyl cyclohexyl ester of cyclohexane-1,2-dicarboxylic acid, methyl isopentyl ester of cyclohexane-1,2-dicarboxylic acid, ethyl isopentyl ester of cyclohexane-1,2-dicarboxylic acid, n-propyl isopentyl ester of cyclohexane-1,2-dicarboxylic acid, isopropyl isopentyl ester of cyclohexane-1,2-dicarboxylic acid, n-butyl isopentyl ester of cyclohexane-1,2-dicarboxylic acid, tert-butyl isopentyl ester of cyclohexane-1,2-dicarboxylic acid, isobutyl isopentyl ester of cyclohexane-1,2-dicarboxylic acid, glycol isopentyl ester of cyclohexane-1,2-dicarboxylic acid, n-hexyl isopentyl ester of cyclohexane-1,2-dicarboxylic acid, isohexyl isopentyl ester of cyclohexane-1,2-dicarboxylic acid, n-heptyl isopentyl ester of cyclohexane-1,2-dicarboxylic acid, isoheptyl isopentyl ester of cyclohexane-1,2-dicarboxylic acid, n-octyl isopentyl ester of cyclohexane-1,2-dicarboxylic acid, isooctyl isopentyl ester of cyclohexane-1,2-dicarboxylic acid, 2-ethylhexyl isopentyl ester of cyclohexane-1,2-dicarboxylic acid, n-nonyl isopentyl ester of cyclohexane-1,2-dicarboxylic acid, isononyl isopentyl ester of cyclohexane-1,2-dicarboxylic acid, 2-propylheptyl isopentyl ester of cyclohexane-1,2-dicarboxylic acid, n-decyl isopentyl ester of cyclohexane-1,2-dicarboxylic acid, isodecyl isopentyl ester of cyclohexane-1,2-dicarboxylic acid, n-undecyl isopentyl ester of cyclohexane-1,2-dicarboxylic acid, isoundecyl isopentyl ester of cyclohexane-1,2-dicarboxylic acid, n-dodecyl isopentyl ester of cyclohexane-1,2-dicarboxylic acid, isododecyl isopentyl ester of cyclohexane-1,2-dicarboxylic acid, n-tridecyl isopentyl ester of cyclohexane-1,2-dicarboxylic acid, isotridecyl isopentyl ester of cyclohexane-1,2-dicarboxylic acid, methyl n-pentyl ester of cyclohexane-1,2-dicarboxylic acid, ethyl n-pentyl ester of cyclohexane-1,2-dicarboxylic acid, n-propyl n-pentyl ester of cyclohexane-1,2-dicarboxylic acid, isopropyl n-pentyl ester of cyclohexane-1,2-dicarboxylic acid, n-butyl n-pentyl ester of cyclohexane-1,2-dicarboxylic acid, tert-butyl n-pentyl ester of cyclohexane-1,2-dicarboxylic acid, isobutyl n-pentyl ester of cyclohexane-1,2-dicarboxylic acid, glycol n-pentyl ester of cyclohexane-1,2-dicarboxylic acid, n-hexyl n-pentyl ester of cyclohexane-1,2-dicarboxylic acid, isohexyl n-pentyl ester of cyclohexane-1,2-dicarboxylic acid, n-heptyl n-pentyl ester of cyclohexane-1,2-dicarboxylic acid, isoheptyl n-pentyl ester of cyclohexane-1,2-dicarboxylic acid, n-octyl n-pentyl ester of cyclohexane-1,2-dicarboxylic acid, isooctyl n-pentyl ester of cyclohexane-1,2-dicarboxylic acid, 2-ethylhexyl n-pentyl ester of cyclohexane-1,2-dicarboxylic acid, n-nonyl n-pentyl ester of cyclohexane-1,2-dicarboxylic acid, isononyl n-pentyl ester of cyclohexane-1,2-dicarboxylic acid, 2-propylheptyl n-pentyl ester of cyclohexane-1,2-dicarboxylic acid, n-decyl n-pentyl ester of cyclohexane-1,2-dicarboxylic acid, isodecyl n-pentyl ester of cyclohexane-1,2-dicarboxylic acid, n-undecyl n-pentyl ester of cyclohexane-1,2-dicarboxylic acid, isoundecyl n-pentyl ester of cyclohexane-1,2-dicarboxylic acid, n-dodecyl n-pentyl ester of cyclohexane-1,2-dicarboxylic acid, isododecyl n-pentyl ester of cyclohexane-1,2-dicarboxylic acid, n-tridecyl n-pentyl ester of cyclohexane-1,2-dicarboxylic acid, isotridecyl n-pentyl ester of cyclohexane-1,2-dicarboxylic acid;

mixed esters of cyclohexane-1,3-dicarboxylic acid with $C_1$-$C_{13}$ alcohols, e.g. ethyl methyl ester of cyclohexane-1,3-dicarboxylic acid, n-propyl methyl ester of cyclohexane-1,3-dicarboxylic acid, isopropyl methyl ester of cyclohexane-1,3-dicarboxylic acid, n-butyl methyl ester of cyclohexane-1,3-dicarboxylic acid, tert-butyl methyl ester of cyclohexane-1,3-dicarboxylic acid, isobutyl methyl ester of cyclohexane-1,3-dicarboxylic acid, glycol methyl ester of cyclohexane-1,3-dicarboxylic acid, n-hexyl methyl ester of cyclohexane-1,3-dicarboxylic acid, isohexyl methyl ester of cyclohexane-1,3-dicarboxylic acid, n-heptyl methyl ester of cyclohexane-1,3-dicarboxylic acid, isoheptyl methyl ester of cyclohexane-1,3-dicarboxylic acid, n-octyl methyl ester of cyclohexane-1,3-dicarboxylic acid, isooctyl methyl ester of cyclohexane-1,3-dicarboxylic acid, 2-ethylhexyl methyl ester of cyclohexane-1,3-dicarboxylic acid, n-nonyl methyl ester of cyclohexane-1,3-dicarboxylic acid, isononyl methyl ester of cyclohexane-1,3-dicarboxylic acid, 2-propylheptyl methyl ester of cyclohexane-1,3-dicarboxylic acid, n-decyl methyl ester of cyclohexane-1,3-dicarboxylic acid, isodecyl methyl ester of cyclohexane-1,3-dicarboxylic acid, n-undecyl methyl ester of cyclohexane-1,3-dicarboxylic acid, isoundecyl methyl ester of cyclohexane-1,3-dicarboxylic acid, n-dodecyl methyl ester of cyclohexane-1,3-dicarboxylic acid, isododecyl methyl ester of cyclohexane-1,3-dicarboxylic acid, n-tridecyl methyl ester of cyclohexane-1,3-dicarboxylic acid, isotridecyl methyl ester of cyclohexane-1,3-dicarboxylic acid, n-propyl ethyl ester of cyclohexane-1,3- dicarboxylic acid, isopropyl ethyl ester of cyclohexane-1,3-dicarboxylic acid, n-butyl ethyl ester of cyclohexane-1,3-dicarboxylic acid, tert-butyl ethyl ester of cyclohexane-1,3-dicarboxylic acid, isobutyl ethyl ester of cyclohexane-1,3-dicarboxylic acid, glycol ethyl ester of cyclohexane-1,3-dicarboxylic acid, n-hexyl ethyl ester of cyclohexane-1,3-dicarboxylic acid, isohexyl ethyl ester of cyclohexane-1,3-dicarboxylic acid, n-heptyl ethyl ester of cyclohexane-1,3-dicarboxylic acid, isoheptyl ethyl ester of cyclohexane-1,3-dicarboxylic acid, n-octyl ethyl ester of cyclohexane-1,3-dicarboxylic acid, isooctyl ethyl ester of cyclohexane-1,3-dicarboxylic acid, 2-ethylhexyl ethyl ester of cyclohexane-1,3-dicarboxylic acid, n-nonyl ethyl ester of cyclohexane-1,3-dicarboxylic acid, isononyl ethyl ester of cyclohexane-1,3-dicarboxylic acid, 2-propylheptyl ethyl ester of cyclohexane-1,3-dicarboxylic acid, n-decyl ethyl ester of cyclohexane-1,3-dicarboxylic acid, isodecyl ethyl ester of cyclohexane-1,3-dicarboxylic acid, n-undecyl ethyl ester of cyclohexane-1,3-dicarboxylic acid, isoundecyl ethyl ester of cyclohexane-1,3-dicarboxylic acid, n-dodecyl ethyl ester of cyclohexane-1,3-dicarboxylic acid, isododecyl ethyl ester of cyclohexane-1,3-dicarboxylic acid, n-tridecyl ethyl ester of cyclohexane-1,3-dicarboxylic acid, isotridecyl ethyl ester of cyclohexane-1,3-dicarboxylic acid, isopropyl n-propyl ester of cyclohexane-1,3-dicarboxylic acid, n-butyl n-propyl ester of cyclohexane-1,3-dicarboxylic acid, tert-butyl n-propyl ester of cyclohexane-1,3-dicarboxylic acid, isobutyl n-propyl ester of cyclohexane-1,3-dicarboxylic acid, glycol n-propyl ester of cyclohexane-1,3-dicarboxylic acid, n-hexyl n-propyl ester of cyclohexane-1,3-dicarboxylic acid, isohexyl n-propyl ester of cyclohexane-1,3-dicarboxylic acid, n-heptyl n-propyl ester of cyclohexane-1,3-dicarboxylic acid, isoheptyl n-propyl ester of cyclohexane-1,3-dicarboxylic acid, n-octyl n-propyl ester of cyclohexane-1,3-dicarboxylic acid, isooctyl n-propyl ester of cyclohexane-1,3-dicarboxylic acid, 2-ethylhexyl n-propyl ester of cyclohexane-1,3-dicarboxylic acid, n-nonyl n-propyl ester of cyclohexane-1,3-dicarboxylic acid, isononyl n-propyl ester of cyclohexane-1,3-dicarboxylic acid, 2-propylheptyl n-propyl ester of cyclohexane-1,3-dicarboxylic acid, n-decyl n-propyl ester of cyclohexane-1,3-dicarboxylic acid, isodecyl n-propyl ester of cyclohexane-1,3-dicarboxylic acid, n-undecyl n-propyl ester of cyclohexane-1,3-dicarboxylic acid, isoundecyl n-propyl ester of cyclohexane-1,3-dicarboxylic acid, n-dodecyl n-propyl ester of cyclohexane-1,3-dicarboxylic acid, isododecyl n-propyl ester of cyclohexane-1,3-dicarboxylic acid, n-tridecyl n-propyl ester of cyclohexane-1,3-dicarboxylic acid, isotridecyl n-propyl ester of cyclohexane-1,3-dicarboxylic acid, n-butyl isopropyl ester of cyclohexane-1,3-dicarboxylic acid, tert-butyl isopropyl ester of cyclohexane-1,3-dicarboxylic acid, isobutyl isopropyl ester of cyclohexane-1,3-dicarboxylic acid, glycol isopropyl ester of cyclohexane-1,3-dicarboxylic acid, n-hexyl isopropyl ester of cyclohexane-1,3-dicarboxylic acid, isohexyl isopropyl ester of cyclohexane-1,3-dicarboxylic acid, n-heptyl isopropyl ester of cyclohexane-1,3-dicarboxylic acid, isoheptyl isopropyl ester of cyclohexane-1,3-dicarboxylic acid, n-octyl isopropyl ester of cyclohexane-1,3-dicarboxylic acid, isooctyl isopropyl ester of cyclohexane-1,3-dicarboxylic acid, 2-ethylhexyl isopropyl ester of cyclohexane-1,3-dicarboxylic acid, n-nonyl isopropyl ester of cyclohexane-1,3-dicarboxylic acid, isononyl isopropyl ester of cyclohexane-1,3-dicarboxylic acid, 2-propylheptyl isopropyl ester of cyclohexane-1,3-dicarboxylic acid, n-decyl isopropyl ester of cyclohexane-1,3-dicarboxylic acid, isodecyl isopropyl ester of cyclohexane-1,3-dicarboxylic acid, n-undecyl isopropyl ester of cyclohexane-1,3-dicarboxylic acid, isoundecyl isopropyl ester of cyclohexane-1,3-dicarboxylic acid, n-dodecyl isopropyl ester of cyclohexane-1,3-dicarboxylic acid, isododecyl isopropyl ester of cyclohexane-1,3-dicarboxylic acid, n-tridecyl isopropyl ester of cyclohexane-1,3-dicarboxylic acid, isotridecyl isopropyl ester of cyclohexane-1,3-dicarboxylic acid, tert-butyl n-butyl ester of cyclohexane-1,3-dicarboxylic acid, isobutyl n-butyl ester of cyclohexane-1,3-dicarboxylic acid, glycol n-butyl ester of cyclohexane-1,3-dicarboxylic acid, n-hexyl n-butyl ester of cyclohexane-1,3-dicarboxylic acid, isohexyl n-butyl ester of cyclohexane-1,3-dicarboxylic acid, n-heptyl n-butyl ester of cyclohexane-1,3-dicarboxylic acid, isoheptyl n-butyl ester of cyclohexane-1,3-dicarboxylic acid, n-octyl n-butyl ester of cyclohexane-1,3-dicarboxylic acid, isooctyl n-butyl ester of cyclohexane-1,3-dicarboxylic acid, 2-ethylhexyl n-butyl ester of cyclohexane-1,3-dicarboxylic acid, n-nonyl n-butyl ester of cyclohexane-1,3-dicarboxylic acid, isononyl n-butyl ester of cyclohexane-1,3-dicarboxylic acid, 2-propylheptyl n-butyl ester of cyclohexane-1,3-dicarboxylic acid, n-decyl n-butyl ester of cyclohexane-1,3-dicarboxylic acid, isodecyl n-butyl ester of cyclohexane-1,3-dicarboxylic acid, n-undecyl n-butyl ester of cyclohexane-1,3-dicarboxylic acid, isoundecyl n-butyl ester of cyclohexane-1,3-dicarboxylic acid, n-dodecyl n-butyl ester of cyclohexane-1,3-dicarboxylic acid, isododecyl n-butyl ester of cyclohexane-1,3-dicarboxylic acid, n-tridecyl n-butyl ester of cyclohexane-1,3-dicarboxylic acid, isotridecyl n-butyl ester of cyclohexane-1,3-dicarboxylic acid, isobutyl tert-butyl ester of cyclohexane-1,3-dicarboxylic acid, glycol tert-butyl ester of cyclohexane-1,3-dicarboxylic acid, n-hexyl tert-butyl ester of cyclohexane-1,3-dicarboxylic acid, isohexyl tert-butyl ester of cyclohexane-1,3-dicarboxylic acid, n-heptyl tert-butyl ester of cyclohexane-1,3-dicarboxylic acid, isoheptyl tert-butyl ester of cyclohexane-1,3-dicarboxylic acid, n-octyl tert-butyl ester of cyclohexane-1,3-dicarboxylic acid, isooctyl tert-butyl ester of cyclohexane-1,3-dicarboxylic acid, 2-ethylhexyl tert-butyl ester of cyclohexane-1,3-dicarboxylic acid, n-nonyl tert-butyl ester of cyclohexane-1,3-dicarboxylic acid, isononyl tert-butyl ester of cyclohexane-1,3-dicarboxylic acid, 2-propylheptyl tert-butyl ester of cyclohexane-1,3-dicarboxylic acid, n-decyl tert-butyl ester of cyclohexane-1,3-dicarboxylic acid, isodecyl tert-butyl ester of cyclohexane-1,3-dicarboxylic acid, n-undecyl tert-butyl ester of cyclohexane-1,3-dicarboxylic acid, isoundecyl tert-butyl ester of cyclohexane-1,3-dicarboxylic acid, n-dodecyl tert-butyl ester of cyclohexane-1,3-dicarboxylic acid, isododecyl tert-butyl ester of cyclohexane-1,3-dicarboxylic acid, n-tridecyl tert-butyl ester of cyclohexane-1,3-dicarboxylic acid, isotridecyl tert-butyl ester of cyclohexane-1,3-dicarboxylic acid, glycol isobutyl ester of cyclohexane-1,3-dicarboxylic acid, n-hexyl isobutyl ester of cyclohexane-1,3-dicarboxylic acid, isohexyl isobutyl ester of cyclohexane-1,3-dicarboxylic acid, n-heptyl isobutyl ester of cyclohexane-1,3-dicarboxylic acid, isoheptyl isobutyl ester of cyclohexane-1,3-dicarboxylic acid, n-octyl isobutyl ester of cyclohexane-1,3-dicarboxylic acid, isooctyl isobutyl ester of cyclohexane-1,3-dicarboxylic acid, 2-ethylhexyl isobutyl ester of cyclohexane-1,3-dicarboxylic acid, n-nonyl isobutyl ester of cyclohexane-1,3-dicarboxylic acid, isononyl isobutyl ester of cyclohexane-1,3-dicarboxylic acid, 2-propylheptyl isobutyl ester of cyclohexane-1,3-dicarboxylic acid, n-decyl isobutyl ester of cyclohexane-1,3-dicarboxylic acid, isodecyl isobutyl ester of cyclohexane-1,3-dicarboxylic acid, n-undecyl isobutyl ester of cyclohexane-1,3-dicarboxylic acid, isoundecyl isobutyl ester of cyclohexane-1,3-dicarboxylic acid, n-dodecyl isobutyl ester of cyclohexane-1,3-dicarboxylic acid, isododecyl isobutyl ester of cyclohexane-1,3-dicarboxylic acid, n-tridecyl isobutyl ester of cyclohexane-1,3-dicarboxylic acid, isotridecyl isobutyl ester of cyclohexane-1,3-dicarboxylic acid, n-hexyl glycol ester of cyclohexane-1,3-dicarboxylic acid, isohexyl glycol ester of cyclohexane-1,3-dicarboxylic acid, n-heptyl glycol ester of cyclohexane-1,3-dicarboxylic acid, isoheptyl glycol ester of cyclohexane-1,3-dicarboxylic acid, n-octyl glycol ester of cyclohexane-1,3-dicarboxylic acid, isooctyl glycol ester of cyclohexane-1,3-dicarboxylic acid, 2-ethylhexyl glycol ester of cyclohexane-1,3-dicarboxylic acid, n-nonyl glycol ester of cyclohexane-1,3-dicarboxylic acid, isononyl glycol ester of cyclohexane-1,3-dicarboxylic acid, 2-propylheptyl glycol ester of cyclohexane-1,3-dicarboxylic acid, n-decyl glycol ester of cyclohexane-1,3-dicarboxylic acid, isodecyl glycol ester of cyclohexane-1,3-dicarboxylic acid, n-undecyl glycol ester of cyclohexane-1,3-dicarboxylic acid, isoundecyl glycol ester of cyclohexane-1,3-dicarboxylic acid, n-dodecyl glycol ester of cyclohexane-1,3-dicarboxylic acid, isododecyl glycol ester of cyclohexane-1,3-dicarboxylic acid, n-tridecyl glycol ester of cyclohexane-1,3-dicarboxylic acid, isotridecyl glycol ester of cyclohexane-1,3-dicarboxylic acid, isohexyl n-hexyl ester of cyclohexane-1,3-dicarboxylic acid, n-heptyl n-hexyl ester of cyclohexane-1,3-dicarboxylic acid, isoheptyl n-hexyl ester of cyclohexane-1,3-dicarboxylic acid, n-octyl n-hexyl ester of cyclohexane-1,3-dicarboxylic acid, isooctyl n-hexyl ester of cyclohexane-1,3-dicarboxylic acid, 2-ethylhexyl n-hexyl ester of cyclohexane-1,3-dicarboxylic acid, n-nonyl n-hexyl ester of cyclohexane-1,3-dicarboxylic acid, isononyl n-hexyl ester of cyclohexane-1,3-dicarboxylic acid, 2-propylheptyl n-hexyl ester of cyclohexane-1,3-dicarboxylic acid, n-decyl n-hexyl ester of cyclohexane-1,3-dicarboxylic acid, isodecyl n-hexyl ester of cyclohexane-1,3-dicarboxylic acid, n-undecyl n-hexyl ester of cyclohexane-1,3-dicarboxylic acid, isoundecyl n-hexyl ester of cyclohexane-1,3-dicarboxylic acid, n-dodecyl n-hexyl ester of cyclohexane-1,3-dicarboxylic acid, isododecyl n-hexyl ester of cyclohexane-1,3-dicarboxylic acid, n-tridecyl n-hexyl ester of cyclohexane-1,3-dicarboxylic acid, isotridecyl n-hexyl ester of cyclohexane-1,3-dicarboxylic acid, n-heptyl isohexyl ester of cyclohexane-1,3-dicarboxylic acid, isoheptyl isohexyl ester of cyclohexane-1,3-dicarboxylic acid, n-octyl isohexyl ester of cyclohexane-1,3-dicarboxylic acid, isooctyl isohexyl ester of cyclohexane-1,3-dicarboxylic acid, 2-ethylhexyl isohexyl ester of cyclohexane-1,3-dicarboxylic acid, n-nonyl isohexyl ester of cyclohexane-1,3-dicarboxylic acid, isononyl isohexyl ester of cyclohexane-1,3-dicarboxylic acid, 2-propylheptyl isohexyl ester of cyclohexane-1,3-dicarboxylic acid, n-decyl isohexyl ester of cyclohexane-1,3-dicarboxylic acid, isodecyl isohexyl ester of cyclohexane-1,3-dicarboxylic acid, n-undecyl isohexyl ester of cyclohexane-1,3-dicarboxylic acid, isoundecyl isohexyl ester of cyclohexane-1,3-dicarboxylic acid, n-dodecyl isohexyl ester of cyclohexane-1,3-dicarboxylic acid, isododecyl isohexyl ester of cyclohexane-1,3-dicarboxylic acid, n-tridecyl isohexyl ester of cyclohexane-1,3-dicarboxylic acid, isotridecyl isohexyl ester of cyclohexane-1,3-dicarboxylic acid, isoheptyl n-heptyl ester of cyclohexane-1,3-dicarboxylic acid, n-octyl n-heptyl ester of cyclohexane-1,3-dicarboxylic acid, isooctyl n-heptyl ester of cyclohexane-1,3-dicarboxylic acid, 2-ethylhexyl n-heptyl ester of cyclohexane-1,3-dicarboxylic acid, n-nonyl n-heptyl ester of cyclohexane-1,3-dicarboxylic acid, isononyl n-heptyl ester of cyclohexane-1,3-dicarboxylic acid, 2-propylheptyl n-heptyl ester of cyclohexane-1,3-dicarboxylic acid, n-decyl n-heptyl ester of cyclohexane-1,3-dicarboxylic acid, isodecyl n-heptyl ester of cyclohexane-1,3-dicarboxylic acid, n-undecyl n-heptyl ester of cyclohexane-1,3-dicarboxylic acid, isoundecyl n-heptyl ester of cyclohexane-1,3-dicarboxylic acid, n-dodecyl n-heptyl ester of cyclohexane-1,3-dicarboxylic acid, isododecyl n-heptyl ester of cyclohexane-1,3-dicarboxylic acid, n-tridecyl n-heptyl ester of cyclohexane-1,3-dicarboxylic acid, isotridecyl n-heptyl ester of cyclohexane-1,3-dicarboxylic acid, n-octyl isoheptyl ester of cyclohexane-1,3-dicarboxylic acid, isooctyl isoheptyl ester of cyclohexane-1,3-dicarboxylic acid, 2-ethylhexyl isoheptyl ester of cyclohexane-1,3-dicarboxylic acid, n-nonyl isoheptyl ester of cyclohexane-1,3-dicarboxylic acid, isononyl isoheptyl ester of cyclohexane-1,3-dicarboxylic acid, 2-propylheptyl isoheptyl ester of cyclohexane-1,3-dicarboxylic acid, n-decyl isohepyl ester of cyclohexane-1,3-dicarboxylic acid, isodecyl isoheptyl ester of cyclohexane-1,3-dicarboxylic acid, n-undecyl isoheptyl ester of cyclohexane-1,3-dicarboxylic acid, isoundecyl isoheptyl ester of cyclohexane-1,3-dicarboxylic acid, n-dodecyl isoheptyl ester of cyclohexane-1,3-dicarboxylic acid, isododecyl isoheptyl ester of cyclohexane-1,3-dicarboxylic acid, n-tridecyl isoheptyl ester of cyclohexane-1,3-dicarboxylic acid, isotridecyl isoheptyl ester of cyclohexane-1,3-dicarboxylic acid, isooctyl n-octyl ester of cyclohexane-1,3-dicarboxylic acid, 2-ethylhexyl n-octyl ester of cyclohexane-1,3-dicarboxylic acid, n-nonyl n-octyl ester of cyclohexane-1,3-dicarboxylic acid, isononyl n-octyl ester of cyclohexane-1,3-dicarboxylic acid, 2-propylheptyl n-octyl ester of cyclohexane-1,3-dicarboxylic acid, n-decyl n-octyl ester of cyclohexane-1,3-dicarboxylic acid, isodecyl n-octyl ester of cyclohexane-1,3-dicarboxylic acid, n-undecyl n-octyl ester of cyclohexane-1,3-dicarboxylic acid, isoundecyl n-octyl ester of cyclohexane-1,3-dicarboxylic acid, n-dodecyl n-octyl ester of cyclohexane-1,3-dicarboxylic acid, isododecyl n-octyl ester of cyclohexane-1,3-dicarboxylic acid, n-tridecyl n-octyl ester of cyclohexane-1,3-dicarboxylic acid, isotridecyl n-octyl ester of cyclohexane-1,3-dicarboxylic acid, 2-ethylhexyl isooctyl ester of cyclohexane-1,3-dicarboxylic acid, n-nonyl isooctyl ester of cyclohexane-1,3-dicarboxylic acid, isononyl isooctyl ester of cyclohexane-1,3-dicarboxylic acid, 2-propylheptyl isooctyl ester of cyclohexane-1,3-dicarboxylic acid, n-decyl isooctyl ester of cyclohexane-1,3-dicarboxylic acid, isodecyl isooctyl ester of cyclohexane-1,3-dicarboxylic acid, n-undecyl isooctyl ester of cyclohexane-1,3-dicarboxylic acid, isoundecyl isooctyl ester of cyclohexane-1,3-dicarboxylic acid, n-dodecyl isooctyl ester of cyclohexane-1,3-dicarboxylic acid, isododecyl isooctyl ester of cyclohexane-1,3-dicarboxylic acid, n-tridecyl isooctyl ester of cyclohexane-1,3-dicarboxylic acid, isotridecyl isooctyl ester of cyclohexane-1,3-dicarboxylic acid, n-nonyl 2-ethylhexyl ester of cyclohexane-1,3-dicarboxylic acid, isononyl 2-ethylhexyl ester of cyclohexane-1,3-dicarboxylic acid, 2-propylheptyl 2-ethylhexyl ester of cyclohexane-1,3-dicarboxylic acid, n-decyl 2-ethylhexyl ester of cyclohexane-1,3-dicarboxylic acid, isodecyl 2-ethylhexyl ester of cyclohexane-1,3-dicarboxylic acid, n-undecyl 2-ethylhexyl ester of cyclohexane-1,3-dicarboxylic acid, isoundecyl 2-ethylhexyl ester of cyclohexane-1,3-dicarboxylic acid, n-dodecyl 2-ethylhexyl ester of cyclohexane-1,3-dicarboxylic acid, isododecyl 2-ethylhexyl ester of cyclohexane-1,3-dicarboxylic acid, n-tridecyl 2-ethylhexyl ester of cyclohexane-1,3-dicarboxylic acid, isotridecyl 2-ethylhexyl ester of cyclohexane-1,3-dicarboxylic acid, isononyl n-nonyl ester of cyclohexane-1,3-dicarboxylic acid, 2-propylheptyl n-nonyl ester of cyclohexane-1,3-dicarboxylic acid, n-decyl n-nonyl ester of cyclohexane-1,3-dicarboxylic acid, isodecyl n-nonyl ester of cyclohexane-1,3-dicarboxylic acid, n-undecyl n-nonyl ester of cyclohexane-1,3-dicarboxylic acid, isoundecyl n-nonyl ester of cyclohexane-1,3-dicarboxylic acid, n-dodecyl n-nonyl ester of cyclohexane-1,3-dicarboxylic acid, isododecyl n-nonyl ester of cyclohexane-1,3-dicarboxylic acid, n-tridecyl n-nonyl ester of cyclohexane-1,3-dicarboxylic acid, isotridecyl n-nonyl ester of cyclohexane-1,3-dicarboxylic acid, 2-propylheptyl isononyl ester of cyclohexane-1,3-dicarboxylic acid, n-decyl isononyl ester of cyclohexane-1,3-dicarboxylic acid, isodecyl isononyl ester of cyclohexane-1,3-dicarboxylic acid, n-undecyl isononyl ester of cyclohexane-1,3-dicarboxylic acid, isoundecyl isononyl ester of cyclohexane-1,3-dicarboxylic acid, n-dodecyl isononyl ester of cyclohexane-1,3-dicarboxylic acid, isododecyl isononyl ester of cyclohexane-1,3-dicarboxylic acid, n-tridecyl isononyl ester of cyclohexane-1,3-dicarboxylic acid, isotridecyl isononyl ester of cyclohexane-1,3-dicarboxylic acid, n-decyl 2-propylheptyl ester of cyclohexane-1,3-dicarboxylic acid, isodecyl 2-propylheptyl ester of cyclohexane-1,3-dicarboxylic acid, n-undecyl 2-propylheptyl ester of cyclohexane-1,3-dicarboxylic acid, isoundecyl 2-propylheptyl ester of cyclohexane-1,3-dicarboxylic acid, n-dodecyl 2-propylheptyl ester of cyclohexane-1,3-dicarboxylic acid, isododecyl 2-propylheptyl ester of cyclohexane-1,3-dicarboxylic acid, n-tridecyl 2-propylheptyl ester of cyclohexane-1,3-dicarboxylic acid, isotridecyl 2-propylheptyl ester of cyclohexane-1,3-dicarboxylic acid, isodecyl n-decyl ester of cyclohexane-1,3-dicarboxylic acid, n-undecyl n-decyl ester of cyclohexane-1,3-dicarboxylic acid, isoundecyl n-decyl ester of cyclohexane-1,3-dicarboxylic acid, n-dodecyl n-decyl ester of cyclohexane-1,3-dicarboxylic acid, isododecyl n-decyl ester of cyclohexane-1,3-dicarboxylic acid, n-tridecyl n-decyl ester of cyclohexane-1,3-dicarboxylic acid, isotridecyl n-decyl ester of cyclohexane-1,3-dicarboxylic acid, n-undecyl isodecyl ester of cyclohexane-1,3-dicarboxylic acid, isoundecyl isodecyl ester of cyclohexane-1,3-dicarboxylic acid, n-dodecyl isodecyl ester of cyclohexane-1,3-dicarboxylic acid, isododecyl isodecyl ester of cyclohexane-1,3-dicarboxylic acid, n-tridecyl isodecyl ester of cyclohexane-1,3-dicarboxylic acid, isotridecyl isodecyl ester of cyclohexane-1,3-dicarboxylic acid, isoundecyl n-undecyl ester of cyclohexane-1,3-dicarboxylic acid, n-dodecyl n-undecyl ester of cyclohexane-1,3-dicarboxylic acid, isododecyl n-undecyl ester of cyclohexane-1,3-dicarboxylic acid, n-tridecyl n-undecyl ester of cyclohexane-1,3-dicarboxylic acid, isotridecyl n-undecyl ester of cyclohexane-1,3-dicarboxylic acid, n-dodecyl isoundecyl ester of cyclohexane-1,3-dicarboxylic acid, isododecyl isoundecyl ester of cyclohexane-1,3-dicarboxylic acid, n-tridecyl isoundecyl ester of cyclohexane-1,3-dicarboxylic acid, isotridecyl isoundecyl ester of cyclohexane-1,3-dicarboxylic acid, isododecyl n-dodecyl ester of cyclohexane-1,3-dicarboxylic acid, n-tridecyl n-dodecyl ester of cyclohexane-1,3-dicarboxylic acid, isotridecyl n-dodecyl ester of cyclohexane-1,3-dicarboxylic acid, n-tridecyl isododecyl ester of cyclohexane-1,3-dicarboxylic acid, isotridecyl isododecyl ester of cyclohexane-1,3-dicarboxylic acid, isotridecyl n-tridecyl ester of cyclohexane-1,3-dicarboxylic acid, methyl cyclohexyl ester of cyclohexane-1,3-dicarboxylic acid, ethyl cyclohexyl ester of cyclohexane-1,3-dicarboxylic acid, n-propyl cyclohexyl ester of cyclohexane-1,3-dicarboxylic acid, isopropyl cyclohexyl ester of cyclohexane-1,3-dicarboxylic acid, n-butyl cyclohexyl ester of cyclohexane-1,3-dicarboxylic acid, tert-butyl cyclohexyl ester of cyclohexane-1,3-dicarboxylic acid, isobutyl cyclohexyl ester of cyclohexane-1,3-dicarboxylic acid, glycol cyclohexyl ester of cyclohexane-1,3-dicarboxylic acid, n-hexyl cyclohexyl ester of cyclohexane-1,3-dicarboxylic acid, isohexyl cyclohexyl ester of cyclohexane-1,3-dicarboxylic acid, n-heptyl cyclohexyl ester of cyclohexane-1,3-dicarboxylic acid, isoheptyl cyclohexyl ester of cyclohexane-1,3-dicarboxylic acid, n-octyl cyclohexyl ester of cyclohexane-1,3-dicarboxylic acid, isooctyl cyclohexyl ester of cyclohexane-1,3-dicarboxylic acid, 2-ethylhexyl cyclohexyl ester of cyclohexane-1,3-dicarboxylic acid, n-nonyl cyclohexyl ester of cyclohexane-1,3-dicarboxylic acid, isononyl cyclohexyl ester of cyclohexane-1,3-dicarboxylic acid, 2-propylheptyl cyclohexyl ester of cyclohexane-1,3-dicarboxylic acid, n-decyl cyclohexyl ester of cyclohexane-1,3-dicarboxylic acid, isodecyl cyclohexyl ester of cyclohexane-1,3-dicarboxylic acid, n-undecyl cyclohexyl ester of cyclohexane-1,3-dicarboxylic acid, isoundecyl cyclohexyl ester of cyclohexane-1,3-dicarboxylic acid, n-dodecyl cyclohexyl ester of cyclohexane-1,3-dicarboxylic acid, isododecyl cyclohexyl ester of cyclohexane-1,3-dicarboxylic acid, n-tridecyl cyclohexyl ester of cyclohexane-1,3-dicarboxylic acid, isotridecyl cyclohexyl ester of cyclohexane-1,3-dicarboxylic acid, methyl isopentyl ester of cyclohexane-1,3-dicarboxylic acid, ethyl isopentyl ester of cyclohexane-1,3-dicarboxylic acid, n-propyl isopentyl ester of cyclohexane-1,3-dicarboxylic acid, isopropyl isopentyl ester of cyclohexane-1,3-dicarboxylic acid, n-butyl isopentyl ester of cyclohexane-1,3-dicarboxylic acid, tert-butyl isopentyl ester of cyclohexane-1,3-dicarboxylic acid, isobutyl isopentyl ester of cyclohexane-1,3-dicarboxylic acid, glycol isopentyl ester of cyclohexane-1,3-dicarboxylic acid, n-hexyl isopentyl ester of cyclohexane-1,3-dicarboxylic acid, isohexyl isopentyl ester of cyclohexane-1,3-dicarboxylic acid, n-heptyl isopentyl ester of cyclohexane-1,3-dicarboxylic acid, isoheptyl isopentyl ester of cyclohexane-1,3-dicarboxylic acid, n-octyl isopentyl ester of cyclohexane-1,3-dicarboxylic acid, isooctyl isopentyl ester of cyclohexane-1,3-dicarboxylic acid, 2-ethylhexyl isopentyl ester of cyclohexane-1,3-dicarboxylic acid, n-nonyl isopentyl ester of cyclohexane-1,3-dicarboxylic acid, isononyl isopentyl ester of cyclohexane-1,3-dicarboxylic acid, 2-propylheptyl isopentyl ester of cyclohexane-1,3-dicarboxylic acid, n-decyl isopentyl ester of cyclohexane-1,3-dicarboxylic acid, isodecyl isopentyl ester of cyclohexane-1,3-dicarboxylic acid, n-undecyl isopentyl ester of cyclohexane-1,3-dicarboxylic acid, isoundecyl isopentyl ester of cyclohexane-1,3-dicarboxylic acid, n-dodecyl isopentyl ester of cyclohexane-1,3-dicarboxylic acid, isododecyl isopentyl ester of cyclohexane-1,3-dicarboxylic acid, n-tridecyl isopentyl ester of cyclohexane-1,3-dicarboxylic acid, isotridecyl isopentyl ester of cyclohexane-1,3-dicarboxylic acid, methyl n-pentyl ester of cyclohexane-1,3-dicarboxylic acid, ethyl n-pentyl ester of cyclohexane-1,3-dicarboxylic acid, n-propyl n-pentyl ester of cyclohexane-1,3-dicarboxylic acid, isopropyl n-pentyl ester of cyclohexane-1,3-dicarboxylic acid, n-butyl n-pentyl ester of cyclohexane-1,3-dicarboxylic acid, tert-butyl n-pentyl ester of cyclohexane-1,3-dicarboxylic acid, isobutyl n-pentyl ester of cyclohexane-1,3-dicarboxylic acid, glycol n-pentyl ester of cyclohexane-1,3-dicarboxylic acid, n-hexyl n-pentyl ester of cyclohexane-1,3-dicarboxylic acid, isohexyl n-pentyl ester of cyclohexane-1,3-dicarboxylic acid, n-heptyl n-pentyl ester of cyclohexane-1,3-dicarboxylic acid, isoheptyl n-pentyl ester of cyclohexane-1,3-dicarboxylic acid, n-octyl n-pentyl ester of cyclohexane-1,3-dicarboxylic acid, isooctyl n-pentyl ester of cyclohexane-1,3-dicarboxylic acid, 2-ethylhexyl n-pentyl ester of cyclohexane-1,3-dicarboxylic acid, n-nonyl n-pentyl ester of cyclohexane-1,3-dicarboxylic acid, isononyl n-pentyl ester of cyclohexane-1,3-dicarboxylic acid, 2-propylheptyl n-pentyl ester of cyclohexane-1,3-dicarboxylic acid, n-decyl n-pentyl ester of cyclohexane-1,3-dicarboxylic acid, isodecyl n-pentyl ester of cyclohexane-1,3-dicarboxylic acid, n-undecyl n-pentyl ester of cyclohexane-1,3-dicarboxylic acid, isoundecyl n-pentyl ester of cyclohexane-1,3-dicarboxylic acid, n-dodecyl n-pentyl ester of cyclohexane-1,3-dicarboxylic acid, isododecyl n-pentyl ester of cyclohexane-1,3-dicarboxylic acid, n-tridecyl n-pentyl ester of cyclohexane-1,3-dicarboxylic acid, isotridecyl n-pentyl ester of cyclohexane-1,3-dicarboxylic acid; mixed esters of cyclohexane-1,4-dicarboxylic acid with $C_1$-$C_{13}$ alcohols, e.g. ethyl methyl ester of cyclohexane-1,4-dicarboxylic acid, n-propyl methyl ester of cyclohexane-1,4-dicarboxylic acid, isopropyl methyl ester of cyclohexane-1,4-dicarboxylic acid, n-butyl methyl ester of cyclohexane-1,4-dicarboxylic acid, tert-butyl methyl ester of cyclohexane-1,4-dicarboxylic acid, isobutyl methyl ester of cyclohexane-1,4-dicarboxylic acid, glycol methyl ester of cyclohexane-1,4-dicarboxylic acid, n-hexyl methyl ester of cyclohexane-1,4-dicarboxylic acid, isohexyl methyl ester of cyclohexane-1,4-dicarboxylic acid, n-heptyl methyl ester of cyclohexane-1,4-dicarboxylic acid, isoheptyl methyl ester of cyclohexane-1,4-dicarboxylic acid, n-octyl methyl ester of cyclohexane-1,4-dicarboxylic acid, isooctyl methyl ester of cyclohexane-1,4-dicarboxylic acid, 2-ethylhexyl methyl ester of cyclohexane-1,4-dicarboxylic acid, n-nonyl methyl ester of cyclohexane-1,4-dicarboxylic acid, isononyl methyl ester of cyclohexane-1,4-dicarboxylic acid, 2-propylheptyl methyl ester of cyclohexane-1,4-dicarboxylic acid, n-decyl methyl ester of cyclohexane-1,4-dicarboxylic acid, isodecyl methyl ester of cyclohexane-1,4-dicarboxylic acid, n-undecyl methyl ester of cyclohexane-1,4-dicarboxylic acid, isoundecyl methyl ester of cyclohexane-1,4-dicarboxylic acid, n-dodecyl methyl ester of cyclohexane-1,4-dicarboxylic acid, isododecyl methyl ester of cyclohexane-1,4-dicarboxylic acid, n-tridecyl methyl ester of cyclohexane-1,4-dicarboxylic acid, isotridecyl methyl ester of cyclohexane-1,4-dicarboxylic acid, n-propyl ethyl ester of cyclohexane-1,4-dicarboxylic acid, isopropyl ethyl ester of cyclohexane-1,4-dicarboxylic acid, n-butyl ethyl ester of cyclohexane-1,4-dicarboxylic acid, tert-butyl ethyl ester of cyclohexane-1,4-dicarboxylic acid, isobutyl ethyl ester of cyclohexane-1,4-dicarboxylic acid, glycol ethyl ester of cyclohexane-1,4-dicarboxylic acid, n-hexyl ethyl ester of cyclohexane-1,4-dicarboxylic acid, isohexyl ethyl ester of cyclohexane-1,4-dicarboxylic acid, n-heptyl ethyl ester of cyclohexane-1,4-dicarboxylic acid, isoheptyl ethyl ester of cyclohexane-1,4-dicarboxylic acid, n-octyl ethyl ester of cyclohexane-1,4-dicarboxylic acid, isooctyl ethyl ester of cyclohexane-1,4-dicarboxylic acid, 2-ethylhexyl ethyl ester of cyclohexane-1,4-dicarboxylic acid, n-nonyl ethyl ester of cyclohexane-1,4-dicarboxylic acid, isononyl ethyl ester of cyclohexane-1,4-dicarboxylic acid, 2-propylheptyl ethyl ester of cyclohexane-1,4-dicarboxylic acid, n-decyl ethyl ester of cyclohexane-1,4-dicarboxylic acid, isodecyl ethyl ester of cyclohexane-1,4-dicarboxylic acid, n-undecyl ethyl ester of cyclohexane-1,4-dicarboxylic acid, isoundecyl ethyl ester of cyclohexane-1,4-dicarboxylic acid, n-dodecyl ethyl ester of cyclohexane-1,4-dicarboxylic acid, isododecyl ethyl ester of cyclohexane-1,4-dicarboxylic acid, n-tridecyl ethyl ester of cyclohexane-1,4-dicarboxylic acid, isotridecyl ethyl ester of cyclohexane-1,4-dicarboxylic acid, isopropyl n-propyl ester of cyclohexane-1,4-dicarboxylic acid, n-butyl n-propyl ester of cyclohexane-1,4-dicarboxylic acid, tert-butyl n-propyl ester of cyclohexane-1,4-dicarboxylic acid, isobutyl n-propyl ester of cyclohexane-1,4-dicarboxylic acid, glycol n-propyl ester of cyclohexane-1,4-dicarboxylic acid, n-hexyl n-propyl ester of cyclohexane-1,4-dicarboxylic acid, isohexyl n-propyl ester of cyclohexane-1,4-dicarboxylic acid, n-heptyl n-propyl ester of cyclohexane-1,4-dicarboxylic acid, isoheptyl n-propyl ester of cyclohexane-1,4-dicarboxylic acid, n-octyl n-propyl ester of cyclohexane-1,4-dicarboxylic acid, isooctyl n-propyl ester of cyclohexane-1,4-dicarboxylic acid, 2-ethylhexyl n-propyl ester of cyclohexane-1,4-dicarboxylic acid, n-nonyl n-propyl ester of cyclohexane-1,4-dicarboxylic acid, isononyl n-propyl ester of cyclohexane-1,4-dicarboxylic acid, 2-propylheptyl n-propyl ester of cyclohexane-1,4-dicarboxylic acid, n-decyl n-propyl ester of cyclohexane-1,4-dicarboxylic acid, isodecyl n-propyl ester of cyclohexane-1,4-dicarboxylic acid, n-undecyl n-propyl ester of cyclohexane-1,4-dicarboxylic acid, isoundecyl n-propyl ester of cyclohexane-1,4-dicarboxylic acid, n-dodecyl n-propyl ester of cyclohexane-1,4-dicarboxylic acid, isododecyl n-propyl ester of cyclohexane-1,4-dicarboxylic acid, n-tridecyl n-propyl ester of cyclohexane-1,4-dicarboxylic acid, isotridecyl n-propyl ester of cyclohexane-1,4-dicarboxylic acid, n-butyl isopropyl ester of cyclohexane-1,4-dicarboxylic acid, tert-butyl isopropyl ester of cyclohexane-1,4-dicarboxylic acid, isobutyl isopropyl ester of cyclohexane-1,4-dicarboxylic acid, glycol isopropyl ester of cyclohexane-1,4-dicarboxylic acid, n-hexyl isopropyl ester of cyclohexane-1,4-dicarboxylic acid, isohexyl isopropyl ester of cyclohexane-1,4-dicarboxylic acid, n-heptyl isopropyl ester of cyclohexane-1,4-dicarboxylic acid, isoheptyl isopropyl ester of cyclohexane-1,4-dicarboxylic acid, n-octyl isopropyl ester of cyclohexane-1,4-dicarboxylic acid, isooctyl isopropyl ester of cyclohexane-1,4-dicarboxylic acid, 2-ethylhexyl isopropyl ester of cyclohexane-1,4-dicarboxylic acid, n-nonyl isopropyl ester of cyclohexane-1,4-dicarboxylic acid, isononyl isopropyl ester of cyclohexane-1,4-dicarboxylic acid, 2-propylheptyl isopropyl ester of cyclohexane-1,4-dicarboxylic acid, n-decyl isopropyl ester of cyclohexane-1,4-dicarboxylic acid, isodecyl isopropyl ester of cyclohexane-1,4-dicarboxylic acid, n-undecyl isopropyl ester of cyclohexane-1,4-dicarboxylic acid, isoundecyl isopropyl ester of cyclohexane-1,4-dicarboxylic acid, n-dodecyl isopropyl ester of cyclohexane-1,4-dicarboxylic acid, isododecyl isopropyl ester of cyclohexane-1,4-dicarboxylic acid, n-tridecyl isopropyl ester of cyclohexane-1,4-dicarboxylic acid, isotridecyl isopropyl ester of cyclohexane-1,4-dicarboxylic acid, tert-butyl n-butyl ester of cyclohexane-1,4-dicarboxylic acid, isobutyl n-butyl ester of cyclohexane-1,4-dicarboxylic acid, glycol n-butyl ester of cyclohexane-1,4-dicarboxylic acid, n-hexyl n-butyl ester of cyclohexane-1,4-dicarboxylic acid, isohexyl n-butyl ester of cyclohexane-1,4-dicarboxylic acid, n-heptyl n-butyl ester of cyclohexane-1,4-dicarboxylic acid, isoheptyl n-butyl ester of cyclohexane-1,4-dicarboxylic acid, n-octyl n-butyl ester of cyclohexane-1,4-dicarboxylic acid, isooctyl n-butyl ester of cyclohexane-1,4-dicarboxylic acid, 2-ethylhexyl n-butyl ester of cyclohexane-1,4-dicarboxylic acid, n-nonyl n-butyl ester of cyclohexane-1,4-dicarboxylic acid, isononyl n-butyl ester of cyclohexane-1,4-dicarboxylic acid, 2-propylheptyl n-butyl ester of cyclohexane-1,4-dicarboxylic acid, n-decyl n-butyl ester of cyclohexane-1,4-dicarboxylic acid, isodecyl n-butyl ester of cyclohexane-1,4-dicarboxylic acid, n-undecyl n-butyl ester of cyclohexane-1,4-dicarboxylic acid, isoundecyl n-butyl ester of cyclohexane-1,4-dicarboxylic acid, n-dodecyl n-butyl ester of cyclohexane-1,4-dicarboxylic acid, isododecyl n-butyl ester of cyclohexane-1,4-dicarboxylic acid, n-tridecyl n-butyl ester of cyclohexane-1,4-dicarboxylic acid, isotridecyl n-butyl ester of cyclohexane-1,4-dicarboxylic acid, isobutyl tert-butyl ester of cyclohexane-1,4-dicarboxylic acid, glycol tert-butyl ester of cyclohexane-1,4-dicarboxylic acid, n-hexyl tert-butyl ester of cyclohexane-1,4-dicarboxylic acid, isohexyl tert-butyl ester of cyclohexane-1,4-dicarboxylic acid, n-heptyl tert-butyl ester of cyclohexane-1,4-dicarboxylic acid, isoheptyl tert-butyl ester of cyclohexane-1,4-dicarboxylic acid, n-octyl tert-butyl ester of cyclohexane-1,4-dicarboxylic acid, isooctyl tert-butyl ester of cyclohexane-1,4- dicarboxylic acid, 2-ethylhexyl tert-butyl ester of cyclohexane-1,4-dicarboxylic acid, n-nonyl tert-butyl ester of cyclohexane-1,4-dicarboxylic acid, isononyl tert-butyl ester of cyclohexane-1,4-dicarboxylic acid, 2-propylheptyl tert-butyl ester of cyclohexane-1,4-dicarboxylic acid, n-decyl tert-butyl ester of cyclohexane-1,4-dicarboxylic acid, isodecyl tert-butyl ester of cyclohexane-1,4-dicarboxylic acid, n-undecyl tert-butyl ester of cyclohexane-1,4-dicarboxylic acid, isoundecyl tert-butyl ester of cyclohexane-1,4-dicarboxylic acid, n-dodecyl tert-butyl ester of cyclohexane-1,4-dicarboxylic acid, isododecyl tert-butyl ester of cyclohexane-1,4-dicarboxylic acid, n-tridecyl tert-butyl ester of cyclohexane-1,4-dicarboxylic acid, isotridecyl tert-butyl ester of cyclohexane-1,4-dicarboxylic acid, glycol isobutyl ester of cyclohexane-1,4-dicarboxylic acid, n-hexyl isobutyl ester of cyclohexane-1,4-dicarboxylic acid, isohexyl isobutyl ester of cyclohexane-1,4-dicarboxylic acid, n-heptyl isobutyl ester of cyclohexane-1,4-dicarboxylic acid, isoheptyl isobutyl ester of cyclohexane-1,4-dicarboxylic acid, n-octyl isobutyl ester of cyclohexane-1,4-dicarboxylic acid, isooctyl isobutyl ester of cyclohexane-1,4-dicarboxylic acid, 2-ethylhexyl isobutyl ester of cyclohexane-1,4-dicarboxylic acid, n-nonyl isobutyl ester of cyclohexane-1,4-dicarboxylic acid, isononyl isobutyl ester of cyclohexane-1,4-dicarboxylic acid, 2-propylheptyl isobutyl ester of cyclohexane-1,4-dicarboxylic acid, n-decyl isobutyl ester of cyclohexane-1,4-dicarboxylic acid, isodecyl isobutyl ester of cyclohexane-1,4-dicarboxylic acid, n-undecyl isobutyl ester of cyclohexane-1,4-dicarboxylic acid, isoundecyl isobutyl ester of cyclohexane-1,4-dicarboxylic acid, n-dodecyl isobutyl ester of cyclohexane-1,4-dicarboxylic acid, isododecyl isobutyl ester of cyclohexane-1,4-dicarboxylic acid, n-tridecyl isobutyl ester of cyclohexane-1,4-dicarboxylic acid, isotridecyl isobutyl ester of cyclohexane-1,4-dicarboxylic acid, n-hexyl glycol ester of cyclohexane-1,4-dicarboxylic acid, isohexyl glycol ester of cyclohexane-1,4-dicarboxylic acid, n-heptyl glycol ester of cyclohexane-1,4-dicarboxylic acid, isoheptyl glycol ester of cyclohexane-1,4-dicarboxylic acid, n-octyl glycol ester of cyclohexane-1,4-dicarboxylic acid, isooctyl glycol ester of cyclohexane-1,4-dicarboxylic acid, 2-ethylhexyl glycol ester of cyclohexane-1,4-dicarboxylic acid, n-nonyl glycol ester of cyclohexane-1,4-dicarboxylic acid, isononyl glycol ester of cyclohexane-1,4-dicarboxylic acid, 2-propylheptyl glycol ester of cyclohexane-1,4-dicarboxylic acid, n-decyl glycol ester of cyclohexane-1,4-dicarboxylic acid, isodecyl glycol ester of cyclohexane-1,4-dicarboxylic acid, n-undecyl glycol ester of cyclohexane-1,4-dicarboxylic acid, isoundecyl glycol ester of cyclohexane-1,4-dicarboxylic acid, n-dodecyl glycol ester of cyclohexane-1,4-dicarboxylic acid, isododecyl glycol ester of cyclohexane-1,4-dicarboxylic acid, n-tridecyl glycol ester of cyclohexane-1,4-dicarboxylic acid, isotridecyl glycol ester of cyclohexane-1,4-dicarboxylic acid, isohexyl n-hexyl ester of cyclohexane-1,4-dicarboxylic acid, n-heptyl n-hexyl ester of cyclohexane-1,4-dicarboxylic acid, isoheptyl n-hexyl ester of cyclohexane-1,4-dicarboxylic acid, n-octyl n-hexyl ester of cyclohexane-1,4-dicarboxylic acid, isooctyl n-hexyl ester of cyclohexane-1,4-dicarboxylic acid, 2-ethylhexyl n-hexyl ester of cyclohexane-1,4-dicarboxylic acid, n-nonyl n-hexyl ester of cyclohexane-1,4-dicarboxylic acid, isononyl n-hexyl ester of cyclohexane-1,4-dicarboxylic acid, 2-propylheptyl n-hexyl ester of cyclohexane-1,4-dicarboxylic acid, n-decyl n-hexyl ester of cyclohexane-1,4-dicarboxylic acid, isodecyl n-hexyl ester of cyclohexane-1,4-dicarboxylic acid, n-undecyl n-hexyl ester of cyclohexane-1,4-dicarboxylic acid, isoundecyl n-hexyl ester of cyclohexane-1,4-dicarboxylic acid, n-dodecyl n-hexyl ester of cyclohexane-1,4-dicarboxylic acid, isododecyl n-hexyl ester of cyclohexane-1,4-dicarboxylic acid, n-tridecyl n-hexyl ester of cyclohexane-1,4-dicarboxylic acid, isotridecyl n-hexyl ester of cyclohexane-1,4-dicarboxylic acid, n-heptyl isohexyl ester of cyclohexane-1,4-dicarboxylic acid, isoheptyl isohexyl ester of cyclohexane-1,4-dicarboxylic acid, n-octyl isohexyl ester of cyclohexane-1,4-dicarboxylic acid, isooctyl isohexyl ester of cyclohexane-1,4-dicarboxylic acid, 2-ethylhexyl isohexyl ester of cyclohexane-1,4-dicarboxylic acid, n-nonyl isohexyl ester of cyclohexane-1,4-dicarboxylic acid, isononyl isohexyl ester of cyclohexane-1,4-dicarboxylic acid, 2-propylheptyl isohexyl ester of cyclohexane-1,4-dicarboxylic acid, n-decyl isohexyl ester of cyclohexane-1,4-dicarboxylic acid, isodecyl isohexyl ester of cyclohexane-1,4-dicarboxylic acid, n-undecyl isohexyl ester of cyclohexane-1,4-dicarboxylic acid, isoundecyl isohexyl ester of cyclohexane-1,4-dicarboxylic acid, n-dodecyl isohexyl ester of cyclohexane-1,4-dicarboxylic acid, isododecyl isohexyl ester of cyclohexane-1,4-dicarboxylic acid, n-tridecyl isohexyl ester of cyclohexane-1,4-dicarboxylic acid, isotridecyl isohexyl ester of cyclohexane-1,4-dicarboxylic acid, isoheptyl n-heptyl ester of cyclohexane-1,4-dicarboxylic acid, n-octyl n-heptyl ester of cyclohexane-1,4-dicarboxylic acid, isooctyl n-heptyl ester of cyclohexane-1,4-dicarboxylic acid, 2-ethylhexyl n-heptyl ester of cyclohexane-1,4-dicarboxylic acid, n-nonyl n-heptyl ester of cyclohexane-1,4-dicarboxylic acid, isononyl n-heptyl ester of cyclohexane-1,4-dicarboxylic acid, 2-propylheptyl n-heptyl ester of cyclohexane-1,4-dicarboxylic acid, n-decyl n-heptyl ester of cyclohexane-1,4-dicarboxylic acid, isodecyl n-heptyl ester of cyclohexane-1,4-dicarboxylic acid, n-undecyl n-heptyl ester of cyclohexane-1,4-dicarboxylic acid, isoundecyl n-heptyl ester of cyclohexane-1,4-dicarboxylic acid, n-dodecyl n-heptyl ester of cyclohexane-1,4-dicarboxylic acid, isododecyl n-heptyl ester of cyclohexane-1,4-dicarboxylic acid, n-tridecyl n-heptyl ester of cyclohexane-1,4-dicarboxylic acid, isotridecyl n-heptyl ester of cyclohexane-1,4-dicarboxylic acid, n-octyl isoheptyl ester of cyclohexane-1,4-dicarboxylic acid, isooctyl isoheptyl ester of cyclohexane-1,4-dicarboxylic acid, 2-ethylhexyl isoheptyl ester of cyclohexane-1,4-dicarboxylic acid, n-nonyl isoheptyl ester of cyclohexane-1,4-dicarboxylic acid, isononyl isoheptyl ester of cyclohexane-1,4-dicarboxylic acid, 2-propylheptyl isoheptyl ester of cyclohexane-1,4-dicarboxylic acid, n-decyl isohepyl ester of cyclohexane-1,4-dicarboxylic acid, isodecyl isoheptyl ester of cyclohexane-1,4-dicarboxylic acid, n-undecyl isoheptyl ester of cyclohexane-1,4-dicarboxylic acid, isoundecyl isoheptyl ester of cyclohexane-1,4-dicarboxylic acid, n-dodecyl isoheptyl ester of cyclohexane-1,4-dicarboxylic acid, isododecyl isoheptyl ester of cyclohexane-1,4-dicarboxylic acid, n-tridecyl isoheptyl ester of cyclohexane-1,4-dicarboxylic acid, isotridecyl isoheptyl ester of cyclohexane-1,4-dicarboxylic acid, isooctyl n-octyl ester of cyclohexane-1,4-dicarboxylic acid, 2-ethylhexyl n-octyl ester of cyclohexane-1,4-dicarboxylic acid, n-nonyl n-octyl ester of cyclohexane-1,4-dicarboxylic acid, isononyl n-octyl ester of cyclohexane-1,4-dicarboxylic acid, 2-propylheptyl n-octyl ester of cyclohexane-1,4-dicarboxylic acid, n-decyl n-octyl ester of cyclohexane-1,4-dicarboxylic acid, isodecyl n-octyl ester of cyclohexane-1,4-dicarboxylic acid, n-undecyl n-octyl ester of cyclohexane-1,4-dicarboxylic acid, isoundecyl n-octyl ester of cyclohexane-1,4-dicarboxylic acid, n-dodecyl n-octyl ester of cyclohexane-1,4-dicarboxylic acid, isododecyl n-octyl ester of cyclohexane-1,4-dicarboxylic acid, n-tridecyl n-octyl ester of cyclohexane-1,4-dicarboxylic acid, isotridecyl n-octyl ester of cyclohexane-1,4-dicarboxylic acid, 2-ethylhexyl isooctyl ester of cyclohexane-1,4-dicarboxylic acid, n-nonyl isooctyl ester of cyclohexane-1,4-dicarboxylic acid, isononyl isooctyl ester of cyclohexane-1,4-dicarboxylic acid, 2-propylheptyl isooctyl ester of cyclohexane-1,4-dicarboxylic acid, n-decyl isooctyl ester of cyclohexane-1,4-dicarboxylic acid, isodecyl isooctyl ester of cyclohexane-1,4-dicarboxylic acid, n-undecyl isooctyl ester of cyclohexane-1,4-dicarboxylic acid, isoundecyl isooctyl ester of cyclohexane-1,4-dicarboxylic acid, n-dodecyl isooctyl ester of cyclohexane-1,4-dicarboxylic acid, isododecyl isooctyl ester of cyclohexane-1,4-dicarboxylic acid, n-tridecyl isooctyl ester of cyclohexane-1,4-dicarboxylic acid, isotridecyl isooctyl ester of cyclohexane-1,4-dicarboxylic acid, n-nonyl 2-ethylhexyl ester of cyclohexane-1,4-dicarboxylic acid, isononyl 2-ethylhexyl ester of cyclohexane-1,4-dicarboxylic acid, 2-propylheptyl 2-ethylhexyl ester of cyclohexane-1,4-dicarboxylic acid, n-decyl 2-ethylhexyl ester of cyclohexane-1,4-dicarboxylic acid, isodecyl 2-ethylhexyl ester of cyclohexane-1,4-dicarboxylic acid, n-undecyl 2-ethylhexyl ester of cyclohexane-1,4-dicarboxylic acid, isoundecyl 2-ethylhexyl ester of cyclohexane-1,4-dicarboxylic acid, n-dodecyl 2-ethylhexyl ester of cyclohexane-1,4-dicarboxylic acid, isododecyl 2-ethylhexyl ester of cyclohexane-1,4-dicarboxylic acid, n-tridecyl 2-ethylhexyl ester of cyclohexane-1,4-dicarboxylic acid, isotridecyl 2-ethylhexyl ester of cyclohexane-1,4-dicarboxylic acid, isononyl n-nonyl ester of cyclohexane-1,4-dicarboxylic acid, 2-propylheptyl n-nonyl ester of cyclohexane-1,4-dicarboxylic acid, n-decyl n-nonyl ester of cyclohexane-1,4-dicarboxylic acid, isodecyl n-nonyl ester of cyclohexane-1,4-dicarboxylic acid, n-undecyl n-nonyl ester of cyclohexane-1,4-dicarboxylic acid, isoundecyl n-nonyl ester of cyclohexane-1,4-dicarboxylic acid, n-dodecyl n-nonyl ester of cyclohexane-1,4-dicarboxylic acid, isododecyl n-nonyl ester of cyclohexane-1,4-dicarboxylic acid, n-tridecyl n-nonyl ester of cyclohexane-1,4-dicarboxylic acid, isotridecyl n-nonyl ester of cyclohexane-1,4-dicarboxylic acid, 2-propylheptyl isononyl ester of cyclohexane-1,4-dicarboxylic acid, n-decyl isononyl ester of cyclohexane-1,4-dicarboxylic acid, isodecyl isononyl ester of cyclohexane-1,4-dicarboxylic acid, n-undecyl isononyl ester of cyclohexane-1,4-dicarboxylic acid, isoundecyl isononyl ester of cyclohexane-1,4-dicarboxylic acid, n-dodecyl isononyl ester of cyclohexane-1,4-dicarboxylic acid, isododecyl isononyl ester of cyclohexane-1,4-dicarboxylic acid, n-tridecyl isononyl ester of cyclohexane-1,4-dicarboxylic acid, isotridecyl isononyl ester of cyclohexane-1,4-dicarboxylic acid, n-decyl 2-propylheptyl ester of cyclohexane-1,4-dicarboxylic acid, isodecyl 2-propylheptyl ester of cyclohexane-1,4-dicarboxylic acid, n-undecyl 2-propylheptyl ester of cyclohexane-1,4-dicarboxylic acid, isoundecyl 2-propylheptyl ester of cyclohexane-1,4-dicarboxylic acid, n-dodecyl 2-propylheptyl ester of cyclohexane-1,4-dicarboxylic acid, isododecyl 2-propylheptyl ester of cyclohexane-1,4-dicarboxylic acid, n-tridecyl 2-propylheptyl ester of cyclohexane-1,4-dicarboxylic acid, isotridecyl 2-propylheptyl ester of cyclohexane-1,4-dicarboxylic acid, isodecyl n-decyl ester of cyclohexane-1,4-dicarboxylic acid, n-undecyl n-decyl ester of cyclohexane-1,4-dicarboxylic acid, isoundecyl n-decyl ester of cyclohexane-1,4-dicarboxylic acid, n-dodecyl n-decyl ester of cyclohexane-1,4-dicarboxylic acid, isododecyl n-decyl ester of cyclohexane-1,4-dicarboxylic acid, n-tridecyl n-decyl ester of cyclohexane-1,4-dicarboxylic acid, isotridecyl n-decyl ester of cyclohexane-1,4-dicarboxylic acid, n-undecyl isodecyl ester of cyclohexane-1,4-dicarboxylic acid, isoundecyl isodecyl ester of cyclohexane-1,4-dicarboxylic acid, n-dodecyl isodecyl ester of cyclohexane-1,4-dicarboxylic acid, isododecyl isodecyl ester of cyclohexane-1,4-dicarboxylic acid, n-tridecyl isodecyl ester of cyclohexane-1,4-dicarboxylic acid, isotridecyl isodecyl ester of cyclohexane-1,4-dicarboxylic acid, isoundecyl n-undecyl ester of cyclohexane-1,4-dicarboxylic acid, n-dodecyl n-undecyl ester of cyclohexane-1,4-dicarboxylic acid, isododecyl n-undecyl ester of cyclohexane-1,4-dicarboxylic acid, n-tridecyl n-undecyl ester of cyclohexane-1,4-dicarboxylic acid, isotridecyl n-undecyl ester of cyclohexane-1,4-dicarboxylic acid, n-dodecyl isoundecyl ester of cyclohexane-1,4-dicarboxylic acid, isododecyl isoundecyl ester of cyclohexane-1,4-dicarboxylic acid, n-tridecyl isoundecyl ester of cyclohexane-1,4-dicarboxylic acid, isotridecyl isoundecyl ester of cyclohexane-1,4-dicarboxylic acid, isododecyl n-dodecyl ester of cyclohexane-1,4-dicarboxylic acid, n-tridecyl n-dodecyl ester of cyclohexane-1,4-dicarboxylic acid, isotridecyl n-dodecyl ester of cyclohexane-1,4-dicarboxylic acid, n-tridecyl isododecyl ester of cyclohexane-1,4-dicarboxylic acid, isotridecyl isododecyl ester of cyclohexane-1,4-dicarboxylic acid, isotridecyl n-tridecyl ester of cyclohexane-1,4-dicarboxylic acid, methyl cyclohexyl ester of cyclohexane-1,4-dicarboxylic acid, ethyl cyclohexyl ester of cyclohexane-1,4-dicarboxylic acid, n-propyl cyclohexyl ester of cyclohexane-1,4-dicarboxylic acid, isopropyl cyclohexyl ester of cyclohexane-1,4-dicarboxylic acid, n-butyl cyclohexyl ester of cyclohexane-1,4-dicarboxylic acid, tert-butyl cyclohexyl ester of cyclohexane-1,4-dicarboxylic acid, isobutyl cyclohexyl ester of cyclohexane-1,4-dicarboxylic acid, glycol cyclohexyl ester of cyclohexane-1,4-dicarboxylic acid, n-hexyl cyclohexyl ester of cyclohexane-1,4-dicarboxylic acid, isohexyl cyclohexyl ester of cyclohexane-1,4-dicarboxylic acid, n-heptyl cyclohexyl ester of cyclohexane-1,4-dicarboxylic acid, isoheptyl cyclohexyl ester of cyclohexane-1,4-dicarboxylic acid, n-octyl cyclohexyl ester of cyclohexane-1,4-dicarboxylic acid, isooctyl cyclohexyl ester of cyclohexane-1,4-dicarboxylic acid, 2-ethylhexyl cyclohexyl ester of cyclohexane-1,4-dicarboxylic acid, n-nonyl cyclohexyl ester of cyclohexane-1,4-dicarboxylic acid, isononyl cyclohexyl ester of cyclohexane-1,4-dicarboxylic acid, 2-propylheptyl cyclohexyl ester of cyclohexane-1,4-dicarboxylic acid, n-decyl cyclohexyl ester of cyclohexane-1,4-dicarboxylic acid, isodecyl cyclohexyl ester of cyclohexane-1,4-dicarboxylic acid, n-undecyl cyclohexyl ester of cyclohexane-1,4-dicarboxylic acid, isoundecyl cyclohexyl ester of cyclohexane-1,4-dicarboxylic acid, n-dodecyl cyclohexyl ester of cyclohexane-1,4-dicarboxylic acid, isododecyl cyclohexyl ester of cyclohexane-1,4-dicarboxylic acid, n-tridecyl cyclohexyl ester of cyclohexane-1,4-dicarboxylic acid, isotridecyl cyclohexyl ester of cyclohexane-1,4-dicarboxylic acid, methyl isopentyl ester of cyclohexane-1,4-dicarboxylic acid, ethyl isopentyl ester of cyclohexane-1,4-dicarboxylic acid, n-propyl isopentyl ester of cyclohexane-1,4-dicarboxylic acid, isopropyl isopentyl ester of cyclohexane-1,4-dicarboxylic acid, n-butyl isopentyl ester of cyclohexane-1,4-dicarboxylic acid, tert-butyl isopentyl ester of cyclohexane-1,4-dicarboxylic acid, isobutyl isopentyl ester of cyclohexane-1,4-dicarboxylic acid, glycol isopentyl ester of cyclohexane-1,4-dicarboxylic acid, n-hexyl isopentyl ester of cyclohexane-1,4-dicarboxylic acid, isohexyl isopentyl ester of cyclohexane-1,4-dicarboxylic acid, n-heptyl isopentyl ester of cyclohexane-1,4-dicarboxylic acid, isoheptyl isopentyl ester of cyclohexane-1,4-dicarboxylic acid, n-octyl isopentyl ester of cyclohexane-1,4-dicarboxylic acid, isooctyl isopentyl ester of cyclohexane-1,4-dicarboxylic acid, 2-ethylhexyl isopentyl ester of cyclohexane-1,4-dicarboxylic acid, n-nonyl isopentyl ester of cyclohexane-1,4-dicarboxylic acid, isononyl isopentyl ester of cyclohexane-1,4-dicarboxylic acid, 2-propylheptyl isopentyl ester of cyclohexane-1,4-dicarboxylic acid, n-decyl isopentyl ester of cyclohexane-1,4-dicarboxylic acid, isodecyl isopentyl ester of cyclohexane-1,4-dicarboxylic acid, n-undecyl isopentyl ester of cyclohexane-1,4-dicarboxylic acid, isoundecyl isopentyl ester of cyclohexane-1,4-dicarboxylic acid, n-dodecyl isopentyl ester of cyclohexane-1,4-dicarboxylic acid, isododecyl isopentyl ester of cyclohexane-1,4-dicarboxylic acid, n-tridecyl isopentyl ester of cyclohexane-1,4-dicarboxylic acid, isotridecyl isopentyl ester of cyclohexane-1,4-dicarboxylic acid, methyl n-pentyl ester of cyclohexane-1,4-dicarboxylic acid, ethyl n-pentyl ester of cyclohexane-1,4-dicarboxylic acid, n-propyl n-pentyl ester of cyclohexane-1,4-dicarboxylic acid, isopropyl n-pentyl ester of cyclohexane-1,4-dicarboxylic acid, n-butyl n-pentyl ester of cyclohexane-1,4-dicarboxylic acid, tert-butyl n-pentyl ester of cyclohexane-1,4-dicarboxylic acid, isobutyl n-pentyl ester of cyclohexane-1,4-dicarboxylic acid, glycol n-pentyl ester of cyclohexane-1,4-dicarboxylic acid, n-hexyl n-pentyl ester of cyclohexane-1,4-dicarboxylic acid, isohexyl n-pentyl ester of cyclohexane-1,4-dicarboxylic acid, n-heptyl n-pentyl ester of cyclohexane-1,4-dicarboxylic acid, isoheptyl n-pentyl ester of cyclohexane-1,4-dicarboxylic acid, n-octyl n-pentyl ester of cyclohexane-1,4-dicarboxylic acid, isooctyl n-pentyl ester of cyclohexane-1,4-dicarboxylic acid, 2-ethylhexyl n-pentyl ester of cyclohexane-1,4-dicarboxylic acid, n-nonyl n-pentyl ester of cyclohexane-1,4-dicarboxylic acid, isononyl n-pentyl ester of cyclohexane-1,4-dicarboxylic acid, 2-propylheptyl n-pentyl ester of cyclohexane-1,4-dicarboxylic acid, n-decyl n-pentyl ester of cyclohexane-1,4-dicarboxylic acid, isodecyl n-pentyl ester of cyclohexane-1,4-dicarboxylic acid, n-undecyl n-pentyl ester of cyclohexane-1,4-dicarboxylic acid, isoundecyl n-pentyl ester of cyciohexane-1,4-dicarboxylic acid, n-dodecyl n-pentyl ester of cyclohexane-1,4-dicarboxylic acid, isododecyl n-pentyl ester of cyclohexane-1,4-dicarboxylic acid, n-tridecyl n-pentyl ester of cyclohexane-1,4-dicarboxylic acid, isotridecyl n-pentyl ester of cyclohexane-1,4-dicarboxylic acid;

alkyl esters of cyclohexane-1,3-dicarboxylic acid, e.g. monomethyl ester of cyclohexane-1,3-dicarboxylic acid, dimethyl ester of cyclohexane-1,3-dicarboxylic acid, diethyl ester of cyclohexane-1,3-dicarboxylic acid, di-n-propyl ester of cyclohexane-1,3-dicarboxylic acid, di-n-butyl ester of cyclohexane-1,3-dicarboxylic acid, di-tert-butyl ester of cyclohexane-1,3-dicarboxylic acid, diisobutyl ester of cyclohexane-1,3-dicarboxylic acid, monoglycol ester of cyclohexane-1,3-dicarboxylic acid, diglycol ester of cyclohexane-1,3-dicarboxylic acid, di-n-octyl ester of cyclohexane-1,3-dicarboxylic acid, diisooctyl ester of cyclohexane-1,3-dicarboxylic acid, di-2-ethylhexyl ester of cyclohexane-1,3-dicarboxylic acid, di-n-nonyl ester of cyclohexane-1,3-dicarboxylic acid, diisononyl ester of cyclohexane-1,3-dicarboxylic acid, di-n-decyl ester of cyclohexane-1,3-dicarboxylic acid, diisodecyl ester of cyclohexane-1,3-dicarboxylic acid, di-n-undecyl ester of cyclohexane-1,3-dicarboxylic acid, diisododecyl ester of cyclohexane-1,3-dicarboxylic acid, di-n-octadecyl ester of cyclohexane-1,3-dicarboxylic acid, diisooctadecyl ester of cyclohexane-1,3-dicarboxylic acid, di-n-eicosyl ester of cyclohexane-1,3-dicarboxylic acid, monocyclohexyl ester of cyclohexane-1,3-dicarboxylic acid, dicyclohexyl ester of cyclohexane-1,3-dicarboxylic acid; diisopropyl ester of cyclohexane-1,3-dicarboxylic acid, di-n-hexyl ester of cyclohexane-1,3-dicarboxylic acid, diisohexyl ester of cyclohexane-1,3-dicarboxylic acid, di-n-heptyl ester of cyclohexane-1,3-dicarboxylic acid, diisoheptyl ester of cyclohexane-1,3-dicarboxylic acid, di-2-propylheptyl ester of cyclohexane-1,3-dicarboxylic acid, diisoundecyl ester of cyclohexane-1,3-dicarboxylic acid, di-n-dodecyl ester of cyclohexane-1,3-dicarboxylic acid, di-n-tridecyl ester of cyclohexane-1,2-dicarboxylic acid, diisotridecyl ester of cyclohexane-1,3-dicarboxylic acid, di-n-pentyl ester of cyclohexane-1,3-dicarboxylic acid, diisopentyl ester of cyclohexane-1,3-dicarboxylic acid;

alkyl esters of cyclohexane-1,2,4-tricarboxylic acid, e.g. monomethyl ester of cyclohexane-1,2,4-tricarboxylic acid, dimethyl ester of cyclohexane-1,2,4-tricarboxylic acid, diethyl ester of cyclohexane-1,2,4-tricarboxylic acid, di-n-propyl ester of cyclohexane-1,2,4-tricarboxylic acid, diisopropyl ester of cyclohexane-1,2,4-tricarboxylic acid, di-n-butyl ester of cyclohexane-1,2,4-tricarboxylic acid, di-tert-butyl ester of cyclohexane-1,2,4-tricarboxylic acid, diisobutyl ester of cyclohexane-1,2,4-tricarboxylic acid, monoglycol ester of cyclohexane-1,2,4-tricarboxylic acid, diglycol ester of cyclohexane-1,2,4-tricarboxylic acid, di-n-octyl ester of cyclohexane-1,2,4-tricarboxylic acid, diisooctyl ester of cyclohexane-1,2,4-tricarboxylic acid, di-2-ethylhexyl ester of cyclohexane-1,2,4-tricarboxylic acid, di-n-nonyl ester of cyclohexane-1,2,4-tricarboxylic acid, diisononyl ester of cyclohexane-1,2,4-tricarboxylic acid, di-n-decyl ester of cyclohexane-1,2,4-tricarboxylic acid, diisodecyl ester of cyclohexane-1,2,4-tricarboxylic acid, di-n-undecyl ester of cyclohexane-1,2,4-tricarboxylic acid, diisododecyl ester of cyclohexane-1,2,4-tricarboxylic acid, di-n-octadecyl ester of cyclohexane-1,2,4-tricarboxylic acid, diisooctadecyl ester of cyclohexane-1,2,4-tricarboxylic acid, di-n-eicosyl ester of cyclohexane-1,2,4-tricarboxylic acid, monocyclohexyl ester of cyclohexane-1,2,4-tricarboxylic acid, dicyclohexyl ester of cyclohexane-1,2,4-tricarboxylic acid, trimethyl ester of cyclohexane-1,2,4-tricarboxylic acid, triethyl ester of cyclohexane-1,2,4-tricarboxylic acid, tri-n-propyl ester of cyclohexane-1,2,4-tricarboxylic acid, tri-n-butyl ester of cyclohexane-1,2,4-tricarboxylic acid, tri-tert-butyl ester of cyclohexane-1,2,4-tricarboxylic acid, triisobutyl ester of cyclohexane-1,2,4-tricarboxylic acid, triglycol ester of cyclohexane-1,2,4-tricarboxylic acid, tri-n-octyl ester of cyclohexane-1,2,4-tricarboxylic acid, triisooctyl ester of cyclohexane-1,2,4-tricarboxylic acid, tri-2-ethylhexyl ester of cyclohexane-1,2,4-tricarboxylic acid, tri-n-nonyl ester of cyclohexane-1,2,4-tricarboxylic acid, triisononyl ester of cyclohexane-1,2,4-tricarboxylic acid, tri-n-decyl ester of cyclohexane-1,2,4-tricarboxylic acid, triisodecyl ester of cyclohexane-1,2,4-tricarboxylic acid, tri-n-undecyl ester of cyclohexane-1,2,4-tricarboxylic acid, triisododecyl ester of cyclohexane-1,2,4-tricarboxylic acid, tri-n-octadecyl ester of cyclohexane-1,2,4-tricarboxylic acid, triisooctadecyl ester of cyclohexane-1,2,4-tricarboxylic acid, tri-n-eicosyl ester of cyclohexane-1,2,4-tricarboxylic acid, tricyclohexyl ester of cyclohexane-1,2,4-tricarboxylic acid, di-n-hexyl ester of cyclohexane-1,2,4-tricarboxylic acid, diisohexyl ester of cyclohexane-1,2,4-tricarboxylic acid, tri-n-hexyl ester of cyclohexane-1,2,4-tricarboxylic acid, triisohexyl ester of cyclohexane-1,2,4-tricarboxylic acid, di-n-heptyl ester of cyclohexane-1,2,4-tricarboxylic acid, diisoheptyl ester of cyclohexane-1,2,4-tricarboxylic acid, tri-n-heptyl ester of cyclohexane-1,2,4-tricarboxylic acid, triisoheptyl ester of cyclohexane-1,2,4-tricarboxylic acid, di-n-pentyl ester of cyclohexane-1,2,4-tricarboxylic acid, diisopentyl ester of cyclohexane-1,2,4-tricarboxylic acid, tri-n-pentyl ester of cyclohexane-1,2,4-tricarboxylic acid, triisopentyl ester of cyclohexane-1,2,4-tricarboxylic acid, di-n-tridecyl ester of cyclohexane-1,2,4-tricarboxylic acid, diisotridecyl ester of cyclohexane-1,2,4-tricarboxylic acid, tri-n-tridecyl ester of cyclohexane-1,2,4-tricarboxylic acid, triisotridecyl ester of cyclohexane-1,2,4-tricarboxylic acid, di-n-dodecyl ester of cyclohexane-1,2,4-tricarboxylic acid, diisoundecyl ester of cyclohexane-1,2,4-tricarboxylic acid, tri-n-dodecyl ester of cyclohexane-1,2,4-tricarboxylic acid, triisoundecyl ester of cyclohexane-1,2,4-tricarboxylic acid, triisopropyl ester of cyclohexane-1,2,4-tricarboxylic acid;

alkyl esters of cyclohexane-1,3,5-tricarboxylic acid, e.g. monomethyl ester of cyclohexane-1,3,5-tricarboxylic acid, dimethyl ester of cyclohexane-1,3,5-tricarboxylic acid, diethyl ester of cyclohexane-1,3,5-tricarboxylic acid, di-n-propyl ester of cyclohexane-1,3,5-tricarboxylic acid, di-n-butyl ester of cyclohexane-1,3,5-tricarboxylic acid, di-tert-butyl ester of cyclohexane-1,3,5-tricarboxylic acid, diisobutyl ester of cyclohexane-1,3,5-tricarboxylic acid, monoglycol ester of cyclohexane-1,3,5-tricarboxylic acid, diglycol ester of cyclohexane-1,3,5-tricarboxylic acid, di-n-octyl ester of cyclohexane-1,3,5-tricarboxylic acid, diisooctyl ester of cyclohexane-1,3,5-tricarboxylic acid, di-2-ethylhexyl ester of cyclohexane-1,3,5-tricarboxylic acid, di-n-nonyl ester of cyclohexane-1,3,5-tricarboxylic acid, diisononyl ester of cyclohexane-1,3,5-tricarboxylic acid, di-n-decyl ester of cyclohexane-1,3,5-tricarboxylic acid, diisodecyl ester of cyclohexane-1,3,5-tricarboxylic acid, di-n-undecyl ester of cyclohexane-1,3,5-tricarboxylic acid, diisododecyl ester of cyclohexane-1,3,5-tricarboxylic acid, di-n-octadecyl ester of cyclohexane-1,3,5-tricarboxylic acid, diisooctadecyl ester of cyclohexane-1,3,5-tricarboxylic acid, di-n-eicosyl ester of cyclohexane-1,3,5-tricarboxylic acid, monocyclohexyl ester of cyclohexane-1,3,5-tricarboxylic acid, dicyclohexyl ester of cyclohexane-1,3,5-tricarboxylic acid, trimethyl ester of cyclohexane-1,3,5-tricarboxylic acid, triethyl ester of cyclohexane-1,3,5-tricarboxylic acid, tri-n-propyl ester of cyclohexane-1,3,5-tricarboxylic acid, tri-n-butyl ester of cyclohexane-1,3,5-tricarboxylic acid, tri-tert-butyl ester of cyclohexane-1,3,5-tricarboxylic acid, triisobutyl ester of cyclohexane-1,3,5-tricarboxylic acid, triglycol ester of cyclohexane-1,3,5-tricarboxylic acid, tri-n-octyl ester of cyclohexane-1,3,5-tricarboxylic acid, triisooctyl ester of cyclohexane-1,3,5-tricarboxylic acid, tri-2-ethylhexyl ester of cyclohexane-1,3,5-tricarboxylic acid, tri-n-nonyl ester of cyclohexane-1,3,5-tricarboxylic acid, triisononyl ester of cyclohexane-1,3,5-tricarboxylic acid, tri-n-decyl ester of cyclohexane-1,3,5-tricarboxylic acid, triisododecyl ester of cyclohexane-1,3,5-tricarboxylic acid, tri-n-undecyl ester of cyclohexane-1,3,5-tricarboxylic acid, triisododecyl ester of cyclohexane-1,3,5-tricarboxylic acid, tri-n-octadecyl ester of cyclohexane-1,3,5-tricarboxylic acid, triisooctadecyl ester of cyclohexane-1,3,5-tricarboxylic acid, tri-n-eicosyl ester of cyclohexane-1,3,5-tricarboxylic acid, tricyclohexyl ester of cyclohexane-1,3,5-tricarboxylic acid, di-n-hexyl ester of cyclohexane-1,3,5-tricarboxylic acid, diisohexyl ester of cyclohexane-1,3,5-tricarboxylic acid, tri-n-hexyl ester of cyclohexane-1,3,5-tricarboxylic acid, triisohexyl ester of cyclohexane-1,3,5-tricarboxylic acid, di-n-heptyl ester of cyclohexane-1,3,5-tricarboxylic acid, diisoheptyl ester of cyclohexane-1,3,5-tricarboxylic acid, tri-n-heptyl ester of cyclohexane-1,3,5-tricarboxylic acid, triisoheptyl ester of cyclohexane-1,3,5-tricarboxylic acid, di-n-pentyl ester of cyclohexane-1,3,5-tricarboxylic acid, diisopentyl ester of cyclohexane-1,3,5-tricarboxylic acid, tri-n-pentyl ester of cyclohexane-1,3,5-tricarboxylic acid, triisopentyl ester of cyclohexane-1,3,5-tricarboxylic acid, di-n-tridecyl ester of cyclohexane-1,3,5-tricarboxylic acid, diisotridecyl ester of cyclohexane-1,3,5-tricarboxylic acid, tri-n-tridecyl ester of cyclohexane-1,3,5-tricarboxylic acid, triisotridecyl ester of cyclohexane-1,3,5-tricarboxylic acid, di-n-dodecyl ester of cyclohexane-1,3,5-tricarboxylic acid, diisoundecyl ester of cyclohexane-1,3,5-tricarboxylic acid, tri-n-dodecyl ester of cyclohexane-1,3,5-tricarboxylic acid, triisoundecyl ester of cyclohexane-1,3,5-tricarboxylic acid, triisopropyl ester of cyclohexane-1,3,5-tricarboxylic acid;

alkyl esters of cyclohexane-1,2,3-tricarboxylic acid, e.g. monomethyl ester of cyclohexane-1,2,3-tricarboxylic acid, dimethyl ester of cyclohexane-1,2,3-tricarboxylic acid, diethyl ester of cyclohexane-1,2,3-tricarboxylic acid, di-n-propyl ester of cyclohexane-1,2,3-tricarboxylic acid, di-n-butyl ester of cyclohexane-1,2,3-tricarboxylic acid, di-tert-butyl ester of cyclohexane-1,2,3-tricarboxylic acid, diisobutyl ester of cyclohexane-1,2,3-tricarboxylic acid, monoglycol ester of cyclohexane-1,2,3-tricarboxylic acid, diglycol ester of cyclohexane-1,2,3-tricarboxylic acid, di-n-octyl ester of cyclohexane-1,2,3-tricarboxylic acid, diisooctyl ester of cyclohexane-1,2,3-tricarboxylic acid, di-2-ethylhexyl ester of cyclohexane-1,2,3-tricarboxylic acid, di-n-nonyl ester of cyclohexane-1,2,3-tricarboxylic acid, diisononyl ester of cyclohexane-1,2,3-tricarboxylic acid, di-n-decyl ester of cyclohexane-1,2,3-tricarboxylic acid, diisodecyl ester of cyclohexane-1,2,3-tricarboxylic acid, di-n-undecyl ester of cyclohexane-1,2,3-tricarboxylic acid, diisododecyl ester of cyclohexane-1,2,3-tricarboxylic acid, di-n-octadecyl ester of cyclohexane-1,2,3-tricarboxylic acid, diisooctadecyl ester of cyclohexane-1,2,3-tricarboxylic acid, di-n-eicosyl ester of cyclohexane-1,2,3-tricarboxylic acid, monocyclohexyl ester of cyclohexane-1,2,3-tricarboxylic acid, dicyclohexyl ester of cyclohexane-1,2,3-tricarboxylic acid, trimethyl ester of cyclohexane-1,2,3-tricarboxylic acid, triethyl ester of cyclohexane-1,2,3-tricarboxylic acid, tri-n-propyl ester of cyclohexane-1,2,3-tricarboxylic acid, tri-n-butyl ester of cyclohexane-1,2,3-tricarboxylic acid, tri-tert-butyl ester of cyclohexane-1,2,3-tricarboxylic acid, triisobutyl ester of cyclohexane-1,2,3-tricarboxylic acid, triglycol ester of cyclohexane-1,2,3-tricarboxylic acid, tri-n-octyl ester of cyclohexane-1,2,3-tricarboxylic acid, triisooctyl ester of cyclohexane-1,2,3-tricarboxylic acid, tri-2-ethylhexyl ester of cyclohexane-1,2,3-tricarboxylic acid, tri-n-nonyl ester of cyclohexane-1,2,3-tricarboxylic acid, triisononyl ester of cyclohexane-1,2,3-tricarboxylic acid, tri-n-decyl ester of cyclohexane-1,2,3-tricarboxylic acid, triisododecyl ester of cyclohexane-1,2,3-tricarboxylic acid, tri-n-undecyl ester of cyclohexane-1,2,3-tricarboxylic acid, triisododecyl ester of cyclohexane-1,2,3-tricarboxylic acid, tri-n-octadecyl ester of cyclohexane-1,2,3-tricarboxylic acid, triisooctadecyl ester of cyclohexane-1,2,3-tricarboxylic acid, tri-n-eicosyl ester of cyclohexane-1,2,3-tricarboxylic acid, tricyclohexyl ester of cyclohexane-1,2,3-tricarboxylic acid, di-n-hexyl ester of cyclohexane-1,2,3-tricarboxylic acid, diisohexyl ester of cyclohexane-1,2,3-tricarboxylic acid, tri-n-hexyl ester of cyclohexane-1,2,3-tricarboxylic acid, triisohexyl ester of cyclohexane-1,2,3-tricarboxylic acid, di-n-heptyl ester of cyclohexane-1,2,3-tricarboxylic acid, diisoheptyl ester of cyclohexane-1,2,3-tricarboxylic acid, tri-n-heptyl ester of cyclohexane-1,2,3-tricarboxylic acid, triisoheptyl ester of cyclohexane-1,2,3-tricarboxylic acid, di-n-pentyl ester of cyclohexane-1,2,3-tricarboxylic acid, diisopentyl ester of cyclohexane-1,2,3-tricarboxylic acid, tri-n-pentyl ester of cyclohexane-1,2,3-tricarboxylic acid, triisopentyl ester of cyclohexane-1,2,3-tricarboxylic acid, di-n-tridecyl ester of cyclohexane-1,2,3-tricarboxylic acid, diisotridecyl ester of cyclohexane-1,2,3-tricarboxylic acid, tri-n-tridecyl ester of cyclohexane-1,2,3-tricarboxylic acid, triisotridecyl ester of cyclohexane-1,2,3-tricarboxylic acid, di-n-dodecyl ester of cyclohexane-1,2,3-tricarboxylic acid, diisoundecyl ester of cyclohexane-1,2,3-tricarboxylic acid, tri-n-dodecyl ester of cyclohexane-1,2,3-tricarboxylic acid, triisoundecyl ester of cyclohexane-1,2,3-tricarboxylic acid, triisopropyl ester of cyclohexane-1,2,3-tricarboxylic acid;

alkyl esters of cyclohexane-1,2,4,5-tetracarboxylic acid, e.g. monomethyl ester of cyclohexane-1,2,4,5-tetracarboxylic acid, dimethyl ester of cyclohexane-1,2,4,5-tetracarboxylic acid, diethyl ester of cyclohexane-1,2,4,5-tetracarboxylic acid, di-n-propyl ester of cyclohexane-1,2,4,5-tetracarboxylic acid, di-n-butyl ester of cyclohexane-1,2,4,5-tetracarboxylic acid, di-tert-butyl ester of cyclohexane-1,2,4,5-tetracarboxylic acid, diisobutyl ester of cyclohexane-1,2,4,5-tetracarboxylic acid, monoglycol ester of cyclohexane-1,2,4,5-tetracarboxylic acid, diglycol ester of cyclohexane-1,2,4,5-tetracarboxylic acid, di-n-octyl ester of cyclohexane-1,2,4,5-tetracarboxylic acid, diisooctyl ester of cyclohexane-1,2,4,5-tetracarboxylic acid, di-2-ethylhexyl ester of cyclohexane-1,2,4,5-tetracarboxylic acid, di-n-nonyl ester of cyclohexane-1,2,4,5-tetracarboxylic acid, diisononyl ester of cyclohexane-1,2,4,5-tetracarboxylic acid, di-n-decyl ester of cyclohexane-1,2,4,5-tetracarboxylic acid, diisodecyl ester of cyclohexane-1,2,4,5-tetracarboxylic acid, di-n-undecyl ester of cyclohexane-1,2,4,5-tetracarboxylic acid, diisododecyl ester of cyclohexane-1,2,4,5-tetracarboxylic acid, di-n-octadecyl ester of cyclohexane-1,2,4,5-tetracarboxylic acid, diisooctadecyl ester of cyclohexane-1,2,4,5-tetracarboxylic acid, di-n-eicosyl ester of cyclohexane-1,2,4,5-tetracarboxylic acid, monocyclohexyl ester of cyclohexane-1,2,4,5-tetracarboxylic acid, trimethyl ester of cyclohexane-1,2,4,5-tetracarboxylic acid, triethyl ester of cyclohexane-1,2,4,5-tetracarboxylic acid, tri-n-propyl ester of cyclohexane-1,2,4,5-tetracarboxylic acid, tri-n-butyl ester of cyclohexane-1,2,4,5-tetracarboxylic acid, tri-tert-butyl ester of cyclohexane-1,2,4,5-tetracarboxylic acid, triisobutyl ester of cyclohexane-1,2,4,5-tetracarboxylic acid, triglycol ester of cyclohexane-1,2,4,5-tetracarboxylic acid, tri-n-octyl ester of cyclohexane-1,2,4,5-tetracarboxylic acid, triisooctyl ester of cyclohexane-1,2,4,5-tetracarboxylic acid, tri-2-ethylhexyl ester of cyclohexane-1,2,4,5-tetracarboxylic acid, tri-n-nonyl ester of cyclohexane-1,2,4,5-tetracarboxylic acid, triisononyl ester of cyclohexane-1,2,4,5-tetracarboxylic acid, tri-n-decyl ester of cyclohexane-1,2,4,5-tetracarboxylic acid, triisododecyl ester of cyclohexane-1,2,4,5-tetracarboxylic acid, tri-n-undecyl ester of cyclohexane-1,2,4,5-tetracarboxylic acid, triisododecyl ester of cyclohexane-1,2,4,5-tetracarboxylic acid, tri-n-octadecyl ester of cyclohexane-1,2,4,5-tetracarboxylic acid, triisooctadecyl ester of cyclohexane-1,2,4,5-tetracarboxylic acid, tri-n-eicosyl ester of cyclohexane-1,2,4,5-tetracarboxylic acid, tricyclohexyl ester of cyclohexane-1,2,4,5-tetracarboxylic acid, tetramethyl ester of cyclohexane-1,2,4,5-tetracarboxylic acid, tetraethyl ester of cyclohexane-1,2,4,5-tetracarboxylic acid, tetra-n-propyl ester of cyclohexane-1,2,4,5-tetracarboxylic acid, tetra-n-butyl ester of cyclohexane-1,2,4,5-tetracarboxylic acid, tetra-tert-butyl ester of cyclohexane-1,2,4,5-tetracarboxylic acid, tetraisobutyl ester of cyclohexane-1,2,4,5-tetracarboxylic acid, tetraglycol ester of cyclohexane-1,2,4,5-tetracarboxylic acid, tetra-n-octyl ester of cyclohexane-1,2,4,5-tetracarboxylic acid, tetraisooctyl ester of cyclohexane-1,2,4,5-tetracarboxylic acid, tetra-2-ethylhexyl ester of cyclohexane-1,2,4,5-tetracarboxylic acid, tetra-n-nonyl ester of cyclohexane-1,2,4,5-tetracarboxylic acid, tetraisononyl ester of cyclohexane-1,2,4,5-tetracarboxylic acid, tetra-n-decyl ester of cyclohexane-1,2,4,5-tetracarboxylic acid, tetraisodecyl ester of cyclohexane-1,2,4,5-tetracarboxylic acid, tetraisododecyl ester of cyclohexane-1,2,4,5-tetracarboxylic acid, tetra-n-undecyl ester of cyclohexane-1,2,4,5-tetracarboxylic acid, tetra-n-octadecyl ester of cyclohexane-1,2,4,5-tetracarboxylic acid, tetraisooctadecyl ester of cyclohexane-1,2,4,5-tetracarboxylic acid, tetra-n-eicosyl ester of cyclohexane-1,2,4,5-tetracarboxylic acid, tetracyclohexyl ester of cyclohexane-1,2,4,5-tetracarboxylic acid, di-n-hexyl ester of cyclohexane-1,2,4,5-tetracarboxylic acid, diisohexyl ester of cyclohexane-1,2,4,5-tetracarboxylic acid, tri-n-hexyl ester of cyclohexane-1,2,4,5-tetracarboxylic acid, triisohexyl ester of cyclohexane-1,2,4,5-tetracarboxylic acid, di-n-heptyl ester of cyclohexane-1,2,4,5-tetracarboxylic acid, diisoheptyl ester of cyclohexane-1,2,4,5-tetracarboxylic acid, tri-n-heptyl ester of cyclohexane-1,2,4,5-tetracarboxylic acid, triisoheptyl ester of cyclohexane-1,2,4,5-tetracarboxylic acid, di-n-pentyl ester of cyclohexane-1,2,4,5-tetracarboxylic acid, diisopentyl ester of cyclohexane-1,2,4,5-tetracarboxylic acid, tri-n-pentyl ester of cyclohexane-1,2,4,5-tetracarboxylic acid, triisopentyl ester of cyclohexane-1,2,4,5-tetracarboxylic acid, di-n-tridecyl ester of cyclohexane-1,2,4,5-tetracarboxylic acid, diisotridecyl ester of cyclohexane-1,2,4,5-tetracarboxylic acid, tri-n-tridecyl ester of cyclohexane-1,2,4,5-tetracarboxylic acid, triisotridecyl ester of cyclohexane-1,2,4,5-tetracarboxylic acid, di-n-dodecyl ester of cyclohexane-1,2,4,5-tetracarboxylic acid, diisoundecyl ester of cyclohexane-1,2,4,5-tetracarboxylic acid, tri-n-dodecyl ester of cyclohexane-1,2,4,5-tetracarboxylic acid, triisoundecyl ester of cyclohexane-1,2,4,5-tetracarboxylic acid, triisopropyl ester of cyclohexane-1,2,4,5-tetracarboxylic acid, tetra-n-hexyl ester of cyclohexane-1,2,4,5-tetracarboxylic acid, tetraisohexyl ester of cyclohexane-1,2,4,5-tetracarboxylic acid, tetra-n-heptyl ester of cyclohexane-1,2,4,5-tetracarboxylic acid, tetraisoheptyl ester of cyclohexane-1,2,4,5-tetracarboxylic acid, tetra-n-pentyl ester of cyclohexane-1,2,4,5-tetracarboxylic acid, tetraisopentyl ester of cyclohexane-1,2,4,5-tetracarboxylic acid, tetra-n-tridecyl ester of cyclohexane-1,2,4,5-tetracarboxylic acid, tetraisotridecyl ester of cyclohexane-1,2,4,5-tetracarboxylic acid, tetra-n-dodecyl ester of cyclohexane-1,2,4,5-tetracarboxylic acid, tetraisoundecyl ester of cyclohexane-1,2,4,5-tetracarboxylic acid, tetraisopropyl ester of cyclohexane-1,2,4,5-tetracarboxylic acid;

anhydrides of cyclohexane-1,2-dicarboxylic acid, cyclohexane-1,2,4-tricarboxylic acid, cyclohexane-1,2,3-tricarboxylic acid, and cyclohexane-1,2,4,5-tetracarboxylic acid.

For the purposes of the present invention, other suitable compounds are the esters of cyclohexane-1,2-dicarboxylic acid disclosed in WO 99/32427 and again listed below:

di(isopentyl) esters of cyclohexane-1,2-dicarboxylic acid obtainable via hydrogenation of di(isopentyl) phthalate with the Chemical Abstracts Registry Number (hereinafter: CAS No.) 84777-06-0;

di(isoheptyl) esters of cyclohexane-1,2-dicarboxylic acid obtainable via hydrogenation of di(isoheptyl) phthalate with the CAS No. 71888-89-6;

di(isononyl) esters of cyclohexane-1,2-dicarboxylic acid obtainable via hydrogenation of a di(isononyl) phthalate with the CAS Nr. 68515-48-0;

di(isononyl) esters of cyclohexane-1,2-dicarboxylic acid obtainable via hydrogenation of a di(isononyl) phthalate with the CAS No. 28553-12-0, based on n-butene;

di(isononyl) esters of cyclohexane-1,2-dicarboxylic acid obtainable via hydrogenation of a di(isononyl) phthalate with the CAS No. 28553-12-0, based on isobutene;

a 1,2-di-C$_9$ ester of cyclohexanedicarboxylic acid obtainable via hydrogenation of a di(nonyl) phthalate with the CAS No. 68515-46-8;

di(isodecyl) ester of cyclohexane-1,2-dicarboxylic acid obtainable via hydrogenation of a di(isodecyl) phthalate with the CAS No. 68515-49-1;

a 1,2-di-C$_{7-11}$ ester of cyclohexanedicarboxylic acid obtainable via hydrogenation of the corresponding ester of phthalic acid with the CAS No. 68515-42-4;

a 1,2-di-C$_{7-11}$ ester of cyclohexanedicarboxylic acid obtainable via hydrogenation of di-C$_{7-11}$ phthalates with the following CAS Nos.
111 381-89-6,
111 381 90-9,
111 381 91-0,
68515-44-6,
68515-45-7, and
3648-20-7;

a 1,2-di-C$_{9-11}$ ester of cyclohexanedicarboxylic acid obtainable via hydrogenation of a di-C$_{9-11}$ phthalate with the CAS No. 98515-43-5;

a 1,2-di(isodecyl) ester of cyclohexanedicarboxylic acid obtainable via hydrogenation of a di(isodecyl) phthalate composed mainly of di(2-propylheptyl) phthalate;

a 1,2-di-C$_{7-9}$ ester of cyclohexanedicarboxylic acid obtainable via hydrogenation of the corresponding esters of phthalic acid of the branched-chain or linear C$_{7-9}$-alkyl ester groups; examples of appropriate phthalates which can be used as starting materials have the following CAS Nos.:
a di-C$_{7,9}$-alkyl phthalate with the CAS No.11 381-89-6;
a di-C$_7$-alkyl phthalate with the CAS No. 68515-44-6; and
a di-C$_9$-alkyl phthalate with the CAS No. 68515-45-7.

The present application incorporates entirely by way of reference that content of WO 99/32427 which, inter alia, refers to the compounds listed immediately above and to the preparation of benzenepolycarboxylic acids using specific catalysts having macropores.

According to the invention it is also possible to use the hydrogenation products of mixed phthalic esters with C$_{10}$ and C$_{13}$ alcohols, these products being described in DE-A 10032580.7. Other compounds suitable for the purposes of the present invention are the hydrogenation products of the commercially available benzenecarboxylic esters with the trade names Jayflex DINP (CAS No. 68515-48-0), Jayflex DIDP (CAS No. 68515-49-1), Palatinol 9-P, Vestinol 9 (CAS No. 28553-12-0), TOTM-I (CAS No. 3319-31-1), Linplast 68-TM, Palatinol N (CAS No. 28553-12-0), Jayflex DHP (CAS No. 68515-50-4), Jayflex DIOP (CAS No.27554-26-3), Jayflex UDP (CAS No. 68515-47-9), Jayflex DIUP (CAS No. 85507-79-5), Jayflex DTDP (CAS No. 68515-47-9), Jayflex L9P (CAS No. 68515-45-7), Jayflex L911 P (CAS No. 68515-43-5), Jayflex L11P (CAS No. 3648-20-2), Witamol 110 (CAS No. 90193-91-2), Witamol 118 (di-n-C$_8$-C$_{10}$-alkyl phthalate), Unimoll BB (CAS No. 85-68-7), Linplast 1012 BP (CAS No. 90193-92-3), Linplast 13 XP (CAS No. 27253-26-5), Linplast 610 P (CAS No. 68515-51-5), Linplast 68 FP (CAS No. 68648-93-1) and Linplast 812 HP (CAS No. 70693-30-0), Palatinol AH (CAS No. 117-81-7), Palatinol 711 (CAS No. 68515-42-4), Palatinol 911 (CAS No. 68515-43-5), Palatinol 11 (CAS No. 3648-20-2), Palatinol Z (CAS No. 26761-40-0) and Palatinol DIPP (CAS No. 84777-06-0).

Particularly preferred printing inks comprise diesters of cyclohexane-1,2-dicarboxylic acid. Preferred ester groups are straight-chain or branched alkyl groups having from 5 to 13 carbon atoms. By way of example, this can be diisononyl cyclohexane-1,2-dicarboxylate, which is also commercially available with the name Hexamoll® DINCH (BASF AG).

The amount of the cyclohexanecarboxylic acid derivatives used is generally from 0.1 to 3% by weight, based on the entirety of all of the constituents of the printing ink, in particular of the packaging-printing ink. The amount is preferably from 0.5 to 2.5% by weight, and particularly preferably from 1 to 2% by weight.

While the plasticizer action is identical to that of conventional plasticizers, the residual solvent content in the printed layer is significantly reduced, and better printing properties are achieved.

The method of production of the inventive printing inks or inventive printing lacquers can in principle be a known method via intensive mixing or intensive dispersion of the constituents in conventional apparatus, such as dissolvers, stirred ball mills, or a three-roll mill. It is advantageous to begin by preparing a concentrated pigment dispersion (also termed a pigment preparation) with a portion of the components, this subsequently being further processed with further constituents and further solvent to give the finished printing ink.

The inventive printing inks can be used for the printing of substrates of any type. In particular, they can be used for the printing of plastics foils and of metal foils. They can moreover be used for the production of multilayer materials for packaging.

The inventive printing lacquers can in particular be used for the priming of plastics foils or of metal foils, or as a protective layer, or as a finishing layer. They can moreover be used for the production of multilayer materials for packaging.

The plastics foils can in particular be polyolefin foils, such as foils composed of polyethylene, polypropylene, or poly(4-methyl-1-pentene), or polystyrene. The polyethylene foils may be foils composed of HDPE, LDPE, or LLDPE. Copolymers can also be involved, examples being foils composed of ethylene-vinyl acetate copolymers, of ethylene-acrylic acid copolymers, or of styrene-butadiene copolymers. It is also possible to use foils composed of PVC or of polycarbonates, or foils composed of polar materials, examples being cellophane foils, polyester foils, for example those composed of polyethylene terephthalate, polybutylene terephthalate, or polyethylene naphthalate, or polyamide foils, such as foils composed of PA 6, PA 12, PA 6/66, PA 6/12, or PA 11.

Examples of metal foils comprise in particular aluminum foils, but by way of example the materials can also comprise tin foils, copper foils, or gold foils.

Multilayer materials for the production of packaging, in particular food packaging, comprise at least two foils. These may in particular be those mentioned at the outset. They may be bonded to one another, by way of example, via lamination or with the aid of suitable laminating adhesives. The composites may also comprise other functional layers, such as odor-barrier layers or water-vapor barriers. Further details concerning the structure of these multilayer materials are mentioned by way of example in EP-A 695 329, EP-A 707 956, EP 802 045, EP-A 1 008 442, EP-A 1 162 060, WO 03/93001, or WO 03/93002 expressly incorporated at this point herein. The inventive printing inks may be used for the printing of the multilayer materials. The printing ink here can be applied to the surface of the multilayer material, but its location can also be between two foils. By way of example, printing lacquers can be used for the priming of individual foils of the material, or else as a protective covering.

The experiments below are intended to provide further illustration of the invention:

A) Production of the Printing Inks

Printing inks were obtained in accordance with the following standard formulation (parts by weight) via intensive mixing or dispersion of all of the components:

| | |
|---|---|
| 70.0 | of pigment preparation (BASF Drucksysteme) |
| 8.0 | of nitrocellulose (Wolff) |
| 6.0 | of polyurethane co-binder (BASF Drucksysteme, 75% strength solution in ethanol) |
| 1.0 | of oleamide (Croda) |
| 0.5 | of PE waxes (BASF AG) | plasticizer (nature and amount as in Table 1)
ethyl acetate as solvent (make-up to 100 parts by weight)

The following plasticizers were used for the Inventive examples and Comparative examples:

TABLE 1

Plasticizers used, prepared via hydrogenation of a di(isononyl) phthalate with CAS No. 28553-12-0

| No. | Plasticizer | Amount |
|---|---|---|
| Inventive example 1 | Diisononyl cyclohexane-1,2-dicarboxylate (Hexamoll ® DINCH, BASF AG) | 1% by weight |
| Inventive example 2 | Diisononyl cyclohexane-1,2-dicarboxylate | 2% by weight |
| Inventive example 3 | Diisononyl cyclohexane-1,2-dicarboxylate | 3% by weight |
| Inventive example 4 | Diisobutyl cyclohexane-1,2-dicarboxylate | 1% by weight |
| Inventive example 5 | Diisobutyl cyclohexane-1,2-dicarboxylate | 2% by weight |
| Inventive example 6 | Diisobutyl cyclohexane-1,2-dicarboxylate | 3% by weight |
| Comparative example 1 | Without plasticizer | — |
| Comparative example 2 | Tributyl acetylcitrate | 1% by weight |
| Comparative example 3 | Tributyl acetylcitrate | 2% by weight |

B) Tests with the Inventive Printing Inks

Using each of the printing inks obtained, a test sample was printed on polyethylene foil, using a conventional intaglio machine. The test sample had various images, writing, solid areas, and also grids from 5 to 95%. The viscosity of the printing ink was comparable, as also were adhesion, scratch resistance, water resistance, and gloss of the printed film. However, there were marked differences in the quality of the prints, and also in the residual solvent content of the printed film.

Table 2 gives the evaluation of the test prints. Table 3 gives the residual solvent contents.

TABLE 2

Test print results

| No. | Comment |
|---|---|
| Inventive example 1 | Uniform print |
| Inventive example 2 | Uniform print |
| Inventive example 3 | Uniform print |
| Inventive example 4 | Uniform print |
| Inventive example 5 | Uniform print |
| Inventive example 6 | Uniform print |

TABLE 2-continued

Test print results

| No. | Comment |
|---|---|
| Comparative example 1 | Inadequate flexibility of printed layer. The 5% grid was non-uniformly printed and had streaks. Some of the points in the grid pattern were not printed. |
| Comparative example 2 | Flexibility of printed layer somewhat better than in C1, but inadequate. The 5% grid was non-uniformly printed and had streaks. Some of the points in the grid pattern were not printed. |
| Comparative example 3 | Uniform print |

TABLE 3

Residual solvent content of printed film

| No. | Plasticizer | Amount | Residual solvent [mg/m$^2$] |
|---|---|---|---|
| Inventive example 1 | Diisononyl cyclohexane-1,2-dicarboxylate | 1% by weight | 31.2 |
| Inventive example 2 | Diisononyl cyclohexane-1,2-dicarboxylate | 2% by weight | 22.1 |
| Inventive example 3 | Diisononyl cyclohexane-1,2-dicarboxylate | 3% by weight | 17.7 |
| Inventive example 4 | Diisobutyl cyclohexane-1,2-dicarboxylate | 1% by weight | 30.8 |
| Inventive example 5 | Diisobutyl cyclohexane-1,2-dicarboxylate | 2% by weight | 20.4 |
| Inventive example 6 | Diisobutyl cyclohexane-1,2-dicarboxylate | 3% by weight | 21 |
| Comparative example 1 | Without plasticizer | — | 41 |
| Comparative example 2 | Tributyl acetylcitrate | 1% by weight | 33 |
| Comparative example 3 | Tributyl acetylcitrate | 2% by weight | 25.5 |

The inventive and comparative examples show that, when comparison is made with conventional plasticizers, half of the amount is adequate to obtain a good printed image when cyclohexanepolycarboxylic acid derivatives are used according to the invention as plasticizers. For the same amount of plasticizer, the amounts of residual solvent in the printed layer were smaller than when using conventional plasticizers.

The invention claimed is:

1. A printing ink, at least comprising at least one solvent or a mixture of various solvents, at least one colorant, at least one polymeric binder, and also one or more additives, wherein at least one of the additives is a cyclohexanepolycarboxylic acid derivative and wherein the at least one cyclohexanepolycarboxylic acid derivative is selected from the group consisting of ring-hydrogenated mono- and dialkyl esters of phthalic acid, isophthalic acid and terephthalic acid, ring-hydrogenated monoalkyl ester of trimellitic acid, dialkyl ester of trimellitic acid, trialkyl ester of trimellitic acid, trimesic acid and hemimellitic acid, ring-hydrogenated mono-, di-, tri-, and tetraalkyl esters of pyromellitic acid, where the alkyl groups may be linear or branched and in each case have from 1 to 30 carbon atoms, or from the group consisting of two or more of these.

2. The printing ink according to claim 1, which is a packaging-printing ink.

3. The printing ink according to claim 2, wherein the proportion of the cyclohexanepolycarboxylic acid derivative is from 0.1 to 3% by weight, based on the entirety of all of the constituents of the printing ink.

4. A printing lacquer, at least comprising at least one solvent or a mixture of various solvents, at least one polymeric binder, and also one or more additives, wherein at least one of the additives is a cyclohexanepolycarboxylic acid derivative and wherein the cyclohexanepolycarboxylic acid derivative is selected from the group consisting of ring-hydrogenated mono- and dialkyl esters of phthalic acid, isophthalic acid and terephthalic acid, ring-hydrogenated monoalkyl ester of trimellitic acid, dialkyl ester of trimellitic acid, trialkyl ester of trimellitic acid, trimesic acid and hemimellitic acid, ring-hydrogenated mono-, di-, tri-, and tetraalkyl esters of pyromellitic acid, where the alkyl groups may be linear or branched and in each case have from 1 to 30 carbon atoms, or from the group consisting of two or more of these.

5. The printing ink according to claim 1, wherein the at least one cyclohexanepolycarboxylic acid derivative is selected from the group consisting of:
  mixed esters of cyclohexane-1,2-dicarboxylic acid with C1-C13 alcohols;
  di(isopentyl) esters of cyclohexane-1,2-dicarboxylic acid obtainable via hydrogenation of di(isopentyl) phthalate with the Chemical Abstracts Registry Number (hereinafter: CAS No.) 84777-06-0;
  di(isoheptyl) esters of cyclohexane-1,2-dicarboxylic acid obtainable via hydrogenation of di(isoheptyl) phthalate with the CAS No. 71888-89-6;
  di(isononyl) esters of cyclohexane-1,2-dicarboxylic acid obtainable via hydrogenation of a di(isononyl) phthalate with the CAS Nr. 68515-48-0;
  di(isononyl) esters of cyclohexane-1,2-dicarboxylic acid obtainable via hydrogenation of a di(isononyl) phthalate with the CAS No. 28553-12-0, based on n-butene;
  di(isononyl) esters of cyclohexane-1,2-dicarboxylic acid obtainable via hydrogenation of a di(isononyl) phthalate with the CAS No. 28553-12-0, based on isobutene;
  a 1,2-di-$C_9$ ester of cyclohexanedicarboxylic acid obtainable via hydrogenation of a di(nonyl) phthalate with the CAS No. 68515-46-8;
  a di(isodecyl) ester of cyclohexane-1,2-dicarboxylic acid obtainable via hydrogenation of a di(isodecyl) phthalate with the CAS No. 68515-49-1;
  a 1,2-di-$C_{7-11}$ ester of cyclohexanedicarboxylic acid obtainable via hydrogenation of the corresponding ester of phthalic acid with the CAS No. 68515-42-4;
  a 1,2-di-$C_{7-11}$ ester of cyclohexanedicarboxylic acid obtainable via hydrogenation of di-$C_{7-11}$ phthalates with the following CAS Nos.
  111 381-89-6,
  111 381 90-9,
  111 381 91-0,
  68515-44-6,
  68515-45-7, and
  3648-20-7;
  a 1,2-di-$C_{9-11}$ ester of cyclohexanedicarboxylic acid obtainable via hydrogenation of a di-$C_{9-11}$ phthalate with the CAS No. 98515-43-5;
  a 1,2-di(isodecyl) ester of cyclohexanedicarboxylic acid obtainable via hydrogenation of a di(isodecyl) phthalate composed mainly of di(2-propylheptyl) phthalate;
  a 1,2-di-$C_{7-9}$ ester of cyclohexanedicarboxylic acid obtainable via hydrogenation of the corresponding esters of phthalic acid of the branched-chain or linear $C_{7-9}$-alkyl ester groups; examples of appropriate phthalates which can be used as staffing materials have the following CAS Nos.:
  a di-$C_{7-9}$-alkyl phthalate with the CAS No. 111 381-89-6;
  a di-$C_7$-alkyl phthalate with the CAS No. 68515-44-6; and
  a di-$C_9$-alkyl phthalate with the CAS No. 68515-45-7;
  hydrogenation products of mixed phthalates with $C_{10}$ alcohols and with $C_{13}$ alcohols;
  alkyl esters of cyclohexane-1,2-dicarboxylic acid;
  hydrogenation products of benzenecarboxylic esters.

6. The printing ink according to claim 1, wherein the at least one cyclohexanepolycarboxylic acid derivative is selected from ring-hydrogenated phthalates which derive from an ester mixture which comprises a mixed ester.

7. A method of utilizing the printing ink according to claim 1 comprising the step of printing plastics foils or metal foils with said printing ink.

8. A method of utilizing the printing lacquer according to claim 4 comprising the step of priming plastics foils or metal foils with said printing lacquer.

9. The printing ink according to claim 5, wherein the at least one cyclohexanepolycarboxylic acid derivative is selected from the group consisting of:
  monomethyl ester of cyclohexane-1,2-dicarboxylic acid, dimethyl ester of cyclohexane-1,2-dicarboxylic acid, diethyl ester of cyclohexane-1,2-dicarboxylic acid, di-n-propyl ester of cyclohexane-1,2-dicarboxylic acid, di-n-butyl ester of cyclohexane-1,2-dicarboxylic acid, di-tert-butyl ester of cyclohexane-1,2-dicarboxylic acid, diisobutyl ester of cyclohexane-1,2-dicarboxylic acid, monoglycol ester of cyclohexane-1,2-dicarboxylic acid, diglycol ester of cyclohexane-1,2-dicarboxylic acid, di-n-octyl ester of cyclohexane-1,2-dicarboxylic acid, diisooctyl ester of cyclohexane-1,2-dicarboxylic acid, di-2-ethylhexyl ester of cyclohexane-1,2-dicarboxylic acid, di-n-nonyl ester of cyclohexane-1,2-dicarboxylic acid, diisononyl ester of cyclohexane-1,2-dicarboxylic acid, di-n-decyl ester of cyclohexane-1,2-dicarboxylic acid, diisodecyl ester of cyclohexane-1,2-dicarboxylic acid, di-n-undecyl ester of cyclohexane-1,2-dicarboxylic acid, diisododecyl ester of cyclohexane-1,2-dicarboxylic acid, di-n-octadecyl ester of cyclohexane-1,2-dicarboxylic acid, diisooctadecyl ester of cyclohexane-1,2-dicarboxylic acid, di-n-eicosyl ester of cyclohexane-1,2-dicarboxylic acid, monocyclohexyl ester of cyclohexane-1,2-dicarboxylic acid, dicyclohexyl ester of cyclohexane-1,2-dicarboxylic acid, diisopropyl ester of cyclohexane-1,2-dicarboxylic acid, di-n-hexyl ester of cyclohexane-1,2-dicarboxylic acid, diisohexyl ester of cyclohexane-1,2-dicarboxylic acid, di-n-heptyl ester of cyclohexane-1,2-dicarboxylic acid, diisoheptyl ester of cyclohexane-1,2-dicarboxylic acid, di-2-propylheptyl ester of cyclohexane-1,2-dicarboxylic acid, diisoundecyl ester of cyclohexane-1,2-dicarboxylic acid, di-n-dodecyl ester of cyclohexane-1,2-dicarboxylic acid, di-n-tridecyl ester of cyclohexane-1,2-dicarboxylic acid, diisotridecyl ester of cyclohexane-1,2-dicarboxylic acid, di-n-pentyl ester of cyclohexane-1,2-dicarboxylic acid, and diisopentyl ester of cyclohexane-1,2-dicarboxylic acid.

10. The printing lacquer according to claim 4, wherein the at least one cyclohexanepolycarboxylic acid derivative is selected from the group consisting of:
  mixed esters of cyclohexane-1,2-dicarboxylic acid with C1-C13 alcohols;
  di(isopentyl) esters of cyclohexane-1,2-dicarboxylic acid obtainable via hydrogenation of di(isopentyl) phthalate with the Chemical Abstracts Registry Number (hereinafter: CAS No.) 84777-06-0;

di(isoheptyl) esters of cyclohexane-1,2-dicarboxylic acid obtainable via hydrogenation of di(isoheptyl) phthalate with the CAS No. 71888-89-6;

di(isononyl) esters of cyclohexane-1,2-dicarboxylic acid obtainable via hydrogenation of a di(isononyl) phthalate with the CAS Nr. 68515-48-0;

di(isononyl) esters of cyclohexane-1,2-dicarboxylic acid obtainable via hydrogenation of a di(isononyl) phthalate with the CAS No. 28553-12-0, based on n-butene;

di(isononyl) esters of cyclohexane-1,2-dicarboxylic acid obtainable via hydrogenation of a di(isononyl) phthalate with the CAS No. 28553-12-0, based on isobutene;

a 1,2-di-$C_9$ ester of cyclohexanedicarboxylic acid obtainable via hydrogenation of a di(nonyl) phthalate with the CAS No. 68515-46-8;

a di(isodecyl) ester of cyclohexane-1,2-dicarboxylic acid obtainable via hydrogenation of a di(isodecyl) phthalate with the CAS No. 68515-49-1;

a 1,2-di-$C_{7-11}$ ester of cyclohexanedicarboxylic acid obtainable via hydrogenation of the corresponding ester of phthalic acid with the CAS No. 68515-42-4;

a 1,2-di-$C_{7-11}$ ester of cyclohexanedicarboxylic acid obtainable via hydrogenation of di-$C_{7-11}$ phthalates with the following CAS Nos.
111 381-89-6,
111 381 90-9,
111 381 91-0,
68515-44-6,
68515-45-7, and
3648-20-7;

a 1,2-di-$C_{9-11}$ ester of cyclohexanedicarboxylic acid obtainable via hydrogenation of a di-$C_{9-11}$ phthalate with the CAS No. 98515-43-5;

a 1,2-di(isodecyl) ester of cyclohexanedicarboxylic acid obtainable via hydrogenation of a di(isodecyl) phthalate composed mainly of di(2-propylheptyl) phthalate;

a 1,2-di-$C_{7-9}$ ester of cyclohexanedicarboxylic acid obtainable via hydrogenation of the corresponding esters of phthalic acid of the branched-chain or linear $C_{7-9}$-alkyl ester groups; examples of appropriate phthalates which can be used as starting materials have the following CAS Nos.:

a di-$C_{7,9}$-alkyl phthalate with the CAS No. 111 381-89-6;
a di-$C_7$-alkyl phthalate with the CAS No. 68515-44-6; and
a di-$C_9$-alkyl phthalate with the CAS No. 68515-45-7;

hydrogenation products of mixed phthalates with $C_{10}$ alcohols and with $C_{13}$ alcohols;

alkyl esters of cyclohexane-1,2-dicarboxylic acid, or hydrogenation products of benzenecarboxylic esters.

11. The printing lacquer-according to claim 4, wherein the at least one cyclohexanepolycarboxylic acid derivative is selected from ring-hydrogenated phthalates which derive from an ester mixture which comprises a mixed ester.

12. The printing lacquer according to claim 10, wherein the at least one cyclohexanepolycarboxylic acid derivative is selected from the group consisting of:

monomethyl ester of cyclohexane-1,2-dicarboxylic acid, dimethyl ester of cyclohexane-1,2-dicarboxylic acid, diethyl ester of cyclohexane-1,2-dicarboxylic acid, di-n-propyl ester of cyclohexane-1,2-dicarboxylic acid, di-n-butyl ester of cyclohexane-1,2-dicarboxylic acid, di-tert-butyl ester of cyclohexane-1,2-dicarboxylic acid, diisobutyl ester of cyclohexane-1,2-dicarboxylic acid, monoglycol ester of cyclohexane-1,2-dicarboxylic acid, diglycol ester of cyclohexane-1,2-dicarboxylic acid, di-n-octyl ester of cyclohexane-1,2-dicarboxylic acid, diisooctyl ester of cyclohexane-1,2-dicarboxylic acid, di-2-ethylhexyl ester of cyclohexane-1,2-dicarboxylic acid, di-n-nonyl ester of cyclohexane-1,2-dicarboxylic acid, diisononyl ester of cyclohexane-1,2-dicarboxylic acid, di-n-decyl ester of cyclohexane-1,2-dicarboxylic acid, diisodecyl ester of cyclohexane-1,2-dicarboxylic acid, di-n-undecyl ester of cyclohexane-1,2-dicarboxylic acid, diisododecyl ester of cyclohexane-1,2-dicarboxylic acid, di-n-octadecyl ester of cyclohexane-1,2-dicarboxylic acid, diisooctadecyl ester of cyclohexane-1,2-dicarboxylic acid, di-n-eicosyl ester of cyclohexane-1,2-dicarboxylic acid, monocyclohexyl ester of cyclohexane-1,2-dicarboxylic acid, dicyclohexyl ester of cyclohexane-1,2-dicarboxylic acid, diisopropyl ester of cyclohexane-1,2-dicarboxylic acid, di-n-hexyl ester of cyclohexane-1,2-dicarboxylic acid, diisohexyl ester of cyclohexane-1,2-dicarboxylic acid, di-n-heptyl ester of cyclohexane-1,2-dicarboxylic acid, diisoheptyl ester of cyclohexane-1,2-dicarboxylic acid, di-2-propylheptyl ester of cyclohexane-1,2-dicarboxylic acid, diisoundecyl ester of cyclohexane-1,2-dicarboxylic acid, di-n-dodecyl ester of cyclohexane-1,2-dicarboxylic acid, di-n-tridecyl ester of cyclohexane-1,2-dicarboxylic acid, diisotridecyl ester of cyclohexane-1,2-dicarboxylic acid, di-n-pentyl ester of cyclohexane-1,2-dicarboxylic acid, and diisopentyl ester of cyclohexane-1,2-dicarboxylic acid.

* * * * *